United States Patent
Nishi

(10) Patent No.: US 9,787,533 B2
(45) Date of Patent: Oct. 10, 2017

(54) OBSTRUCTION DETERMINATION DEVICE

(71) Applicant: FUJITSU LIMITED, Kawasaki-shi, Kanagawa (JP)

(72) Inventor: Tetsuya Nishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 619 days.

(21) Appl. No.: 14/253,942

(22) Filed: Apr. 16, 2014

(65) Prior Publication Data

US 2014/0337512 A1     Nov. 13, 2014

(30) Foreign Application Priority Data

May 8, 2013   (JP) ................................ 2013-098546

(51) Int. Cl.
   *G06F 15/173*   (2006.01)
   *H04L 12/24*    (2006.01)
   *H04L 12/801*   (2013.01)
   *H04L 12/751*   (2013.01)

(52) U.S. Cl.
   CPC .......... *H04L 41/0677* (2013.01); *H04L 45/02* (2013.01); *H04L 47/11* (2013.01)

(58) Field of Classification Search
   CPC . H04L 43/0888; H04L 47/11; H04L 41/0677; H04L 45/02
   See application file for complete search history.

(56) References Cited

U.S. PATENT DOCUMENTS

| 6,816,456 | B1 * | 11/2004 | Tse-Au | ............... | H04L 41/5054 370/230.1 |
| 8,593,964 | B1 * | 11/2013 | Sinha | ..................... | H04L 47/11 370/235 |
| 2005/0223089 | A1 * | 10/2005 | Rhodes | ............... | H04L 43/0876 709/223 |

(Continued)

FOREIGN PATENT DOCUMENTS

| EP | 1069801 | 1/2001 |
| JP | 2011-146982 | 7/2011 |

OTHER PUBLICATIONS

Extended European Search Report of EP Patent Application No. 14165599.3 dated Jul. 15, 2014.

*Primary Examiner* — Sargon Nano
*Assistant Examiner* — Kidest Mendaye
(74) *Attorney, Agent, or Firm* — Fujitsu Patent Center

(57) ABSTRACT

A obstruction determination process by a program stored in a recording medium comprises (i) in cases in which a connection data has been received from a plurality of transfer devices connected to a non-transmitting transfer device which is not transmitting the connection data, identifying a non-transmitting transfer device transfer path on which the non-transmitting transfer device is positioned; and (ii) determining for each of the identified transfer paths whether or not an obstruction has occurred on the identified transfer path, and in cases in which the identified transfer path is the non-transmitting transfer device transfer path identified, employing the transfer volume data that has been (Continued)

received from another transfer device positioned on the non-transmitting transfer device transfer path as the transfer volume data of the non-transmitting transfer device to determine whether or not an obstruction has occurred on the identified transfer path.

12 Claims, 44 Drawing Sheets

(56) References Cited

U.S. PATENT DOCUMENTS

| | | | | |
|---|---|---|---|---|
| 2007/0248013 | A1* | 10/2007 | Sridharan | H04L 47/10 370/235 |
| 2013/0051228 | A1* | 2/2013 | Kim | H04W 4/005 370/230 |
| 2013/0135999 | A1* | 5/2013 | Bloch | H04L 47/263 370/235 |
| 2014/0198638 | A1* | 7/2014 | Campbell | H04L 47/12 370/230 |
| 2016/0014030 | A1* | 1/2016 | Thyni | H04W 36/30 370/237 |

* cited by examiner

FIG.3A

TOPOLOGY (LINK DATA) MANAGEMENT TABLE

| SWITCH ID | OUTPUT PORT ID | ADJACENT SWITCH ID | INPUT PORT ID OF ADJACENT SWITCH |
|---|---|---|---|
| OFS1 | 1 | OFS3 | 1 |
| OFS1 | 2 | OFS2 | 3 |
| ⋮ | ⋮ | ⋮ | ⋮ |
| OFSn | i | OFSm | j |

FIG.3B

PAST (PREVIOUS NORMAL TIME) TOPOLOGY (LINK DATA) MANAGEMENT TABLE

| SWITCH ID | OUTPUT PORT ID | ADJACENT SWITCH ID | INPUT PORT ID OF ADJACENT SWITCH |
|---|---|---|---|
| OFS1 | 1 | OFS3 | 1 |
| OFS1 | 2 | OFS2 | 1 |
| ⋮ | ⋮ | ⋮ | ⋮ |
| OFSx | i | OFSy | j |

FIG.3C

OBSTRUCTION LINK MANAGEMENT TABLE

| SWITCH ID | OUTPUT PORT ID | ADJACENT SWITCH ID | INPUT PORT ID OF ADJACENT SWITCH |
|---|---|---|---|
| OFS1 | 1 | OFS3 | 1 |
| OFS1 | 2 | OFS2 | 1 |
| ⋮ | ⋮ | ⋮ | ⋮ |
| OFSt | i | OFSu | j |

FIG.4

EDGE (SERVER OR CLIENT) DATA MANAGEMENT TABLE

| EDGE IP ADDRESS | ADJACENT SWITCH ID | CONNECTION PORT ID OF ADJACENT SWITCH |
|---|---|---|
| a.b.c.d | OFS5 | 3 |
| a.b.c.e | OFS1 | 3 |
| ⋮ | ⋮ | ⋮ |
| a.b.c.x | OFSn | y |

FIG.5

FLOW DATA MANAGEMENT TABLE

| FLOW ID | TRANSMISSION SOURCE IP ADDRESS | DESTINATION IP ADDRESS | OUTPUT PACKET NUMBER (MAXIMUM VALUE) | OUTPUT PACKET NUMBER (MINIMUM VALUE) |
|---|---|---|---|---|
| 1 | a.b.c.d | a.b.c.e | 1000 | 1000 |
| 2 | a.b.c.e | a.b.c.d | 1000 | 1000 |
| 3 | a.b.c.d | a.b.c.f | 500 | 500 |
| 4 | a.b.c.f | a.b.c.d | 1000 | 500 |
| ⋮ | ⋮ | ⋮ | ⋮ | ⋮ |
| n-1 | a.b.c.d | a.b.c.x | 500 | 500 |
| n | a.b.c.x | a.b.c.d | 1000 | 1000 |

FIG.6

FLOW STATE MANAGEMENT TABLE

| CONNECTION ID | IP ADDRESS (ONE SIDE) | IP ADDRESS (REVERSE SIDE) | TRANSMITTED PACKET NUMBER | DIFFERENCE VALUE OF TRANSMITTED PACKETS | RECEIVED PACKET NUMBER | DIFFERENCE VALUE OF RECEIVED PACKETS | DETERMINATION RESULT |
|---|---|---|---|---|---|---|---|
| 1 | a.b.c.d | a.b.c.e | 1000 | 0 | 1000 | 0 | G |
| 2 | a.b.c.d | a.b.c.f | 500 | 0 | 1000 | 500 | NG |
| •••• | •••• | •••• | •••• | •••• | •••• | •••• | •••• |
| k | a.b.c.d | a.b.c.x | 500 | 0 | 1000 | 0 | NG |

FIG.7A

FLOW PATH DATA TABLE (NODES)

| FLOW ID | NODE 1 | NODE 2 | NODE 3 | NODE 4 | NODE 5 | |
|---------|--------|--------|--------|--------|--------|---|
| 1 | a.b.c.d | OFS5 | OFS3 | OFS1 | a.b.c.e | •••• |
| 2 | a.b.c.e | OFS1 | OFS3 | OFS5 | a.b.c.d | |
| 3 | a.b.c.d | OFS5 | OFS3 | OFS1 | a.b.c.f | |
| 4 | a.b.c.f | OFS1 | OFS3 | OFS5 | a.b.c.d | |
| •••• | •••• | •••• | •••• | •••• | | |
| n-1 | a.b.c.d | OFS5 | OFS4 | OFS2 | a.b.c.x | |
| n | a.b.c.x | OFS2 | OFS4 | OFS5 | a.b.c.d | |

FIG.7B

FLOW PATH DATA TABLE (OUTPUT PORTS)

| FLOW ID | PORT 1 | PORT 2 | PORT 3 | PORT 4 | PORT 5 | ••• |
|---------|--------|--------|--------|--------|--------|-----|
| 1 | 1 | 1 | 1 | 1 | | |
| 2 | 1 | 3 | 4 | 3 | | |
| 3 | 1 | 1 | 1 | 2 | | |
| 4 | 1 | 3 | 4 | 3 | | |
| •••• | •••• | •••• | •••• | •••• | | |
| n-1 | 1 | 2 | 1 | 1 | | |
| n | 1 | 3 | 4 | 3 | | |

FIG.8A

PAST (PREVIOUS NORMAL TIME) FLOW PATH DATA TABLE (NODES)

| FLOW ID | NODE 1 | NODE 2 | NODE 3 | NODE 4 | NODE 5 | |
|---|---|---|---|---|---|---|
| 1 | a.b.c.d | OFS5 | OFS3 | OFS1 | a.b.c.e | •••• |
| 2 | a.b.c.e | OFS1 | OFS3 | OFS5 | a.b.c.d | |
| 3 | a.b.c.d | OFS5 | OFS3 | OFS1 | a.b.c.f | |
| 4 | a.b.c.f | OFS1 | OFS3 | OFS5 | a.b.c.d | |
| •••• | •••• | •••• | •••• | •••• | | |
| n-1 | a.b.c.d | OFS5 | OFS4 | OFS2 | a.b.c.x | |
| n | a.b.c.x | OFS2 | OFS4 | OFS5 | a.b.c.d | |

FIG.8B

PAST (PREVIOUS NORMAL TIME) FLOW PATH DATA TABLE (OUTPUT PORTS)

| FLOW ID | PORT 1 | PORT 2 | PORT 3 | PORT 4 | PORT 5 | ... |
|---------|--------|--------|--------|--------|--------|-----|
| 1 | 1 | 1 | 1 | 1 | | |
| 2 | 1 | 3 | 4 | 3 | | |
| 3 | 1 | 1 | 1 | 2 | | |
| 4 | 1 | 3 | 4 | 3 | | |
| ... | ... | ... | ... | ... | | |
| n-1 | 1 | 2 | 1 | 1 | | |
| n | 1 | 3 | 4 | 3 | | |

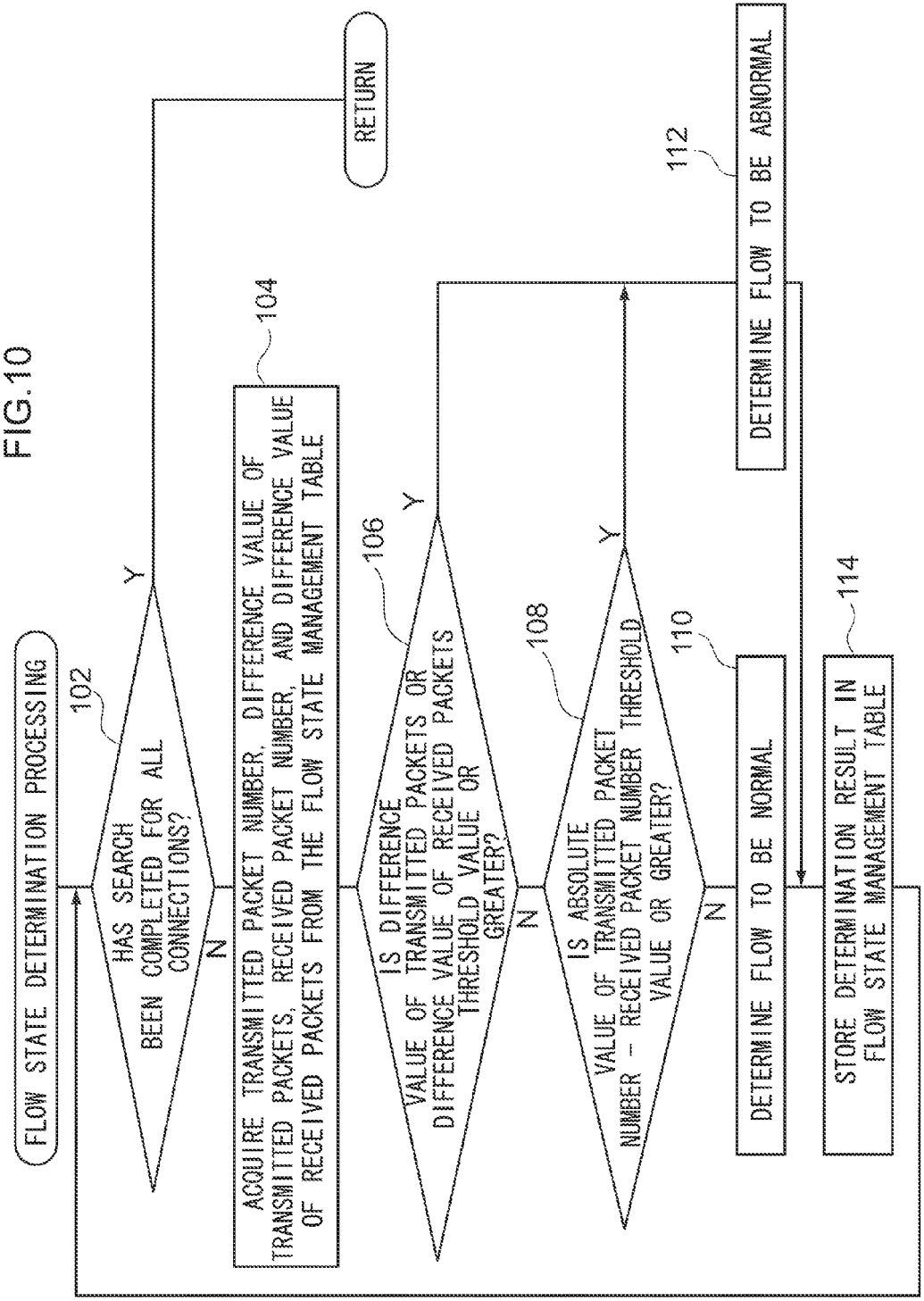

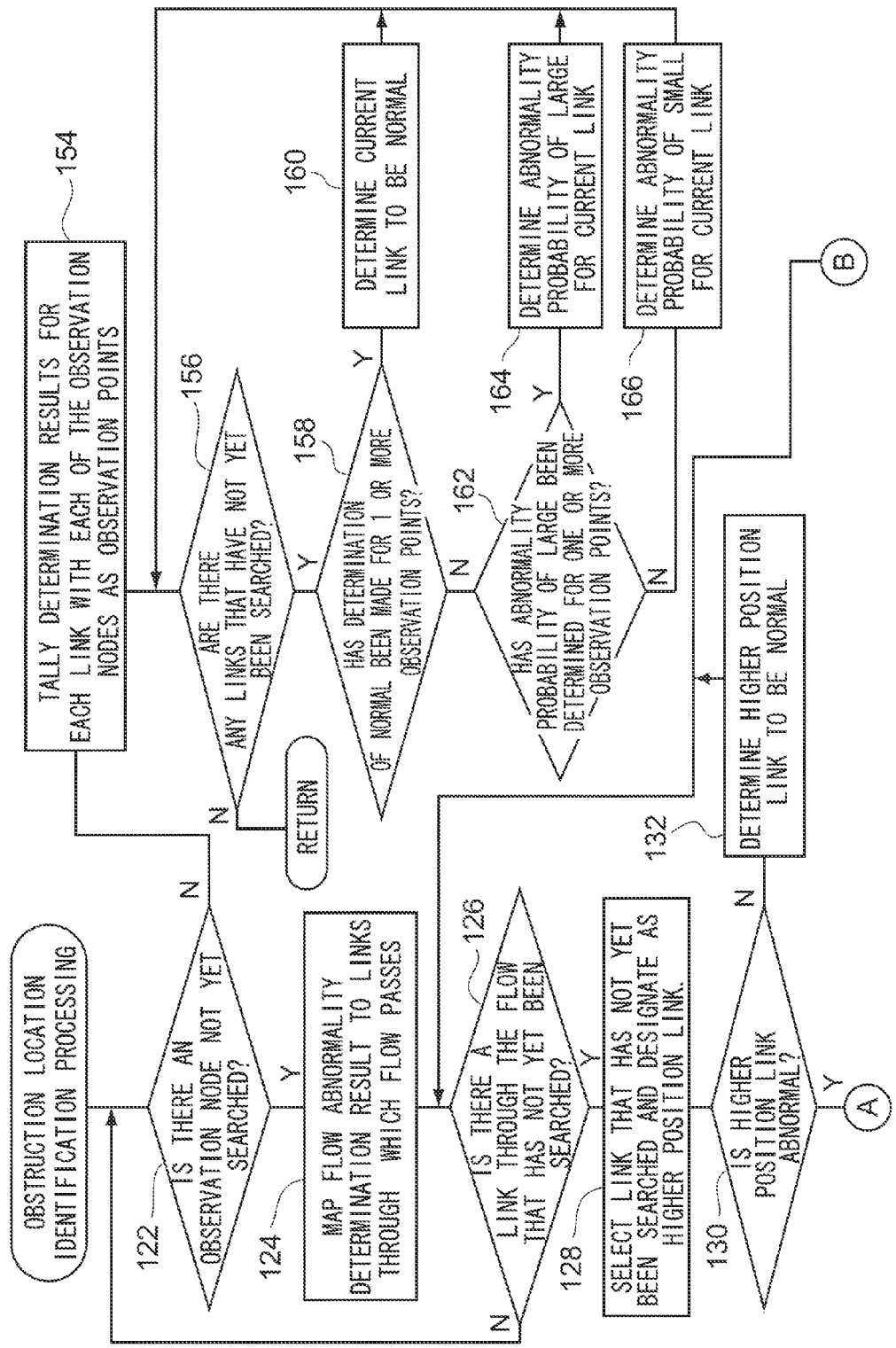

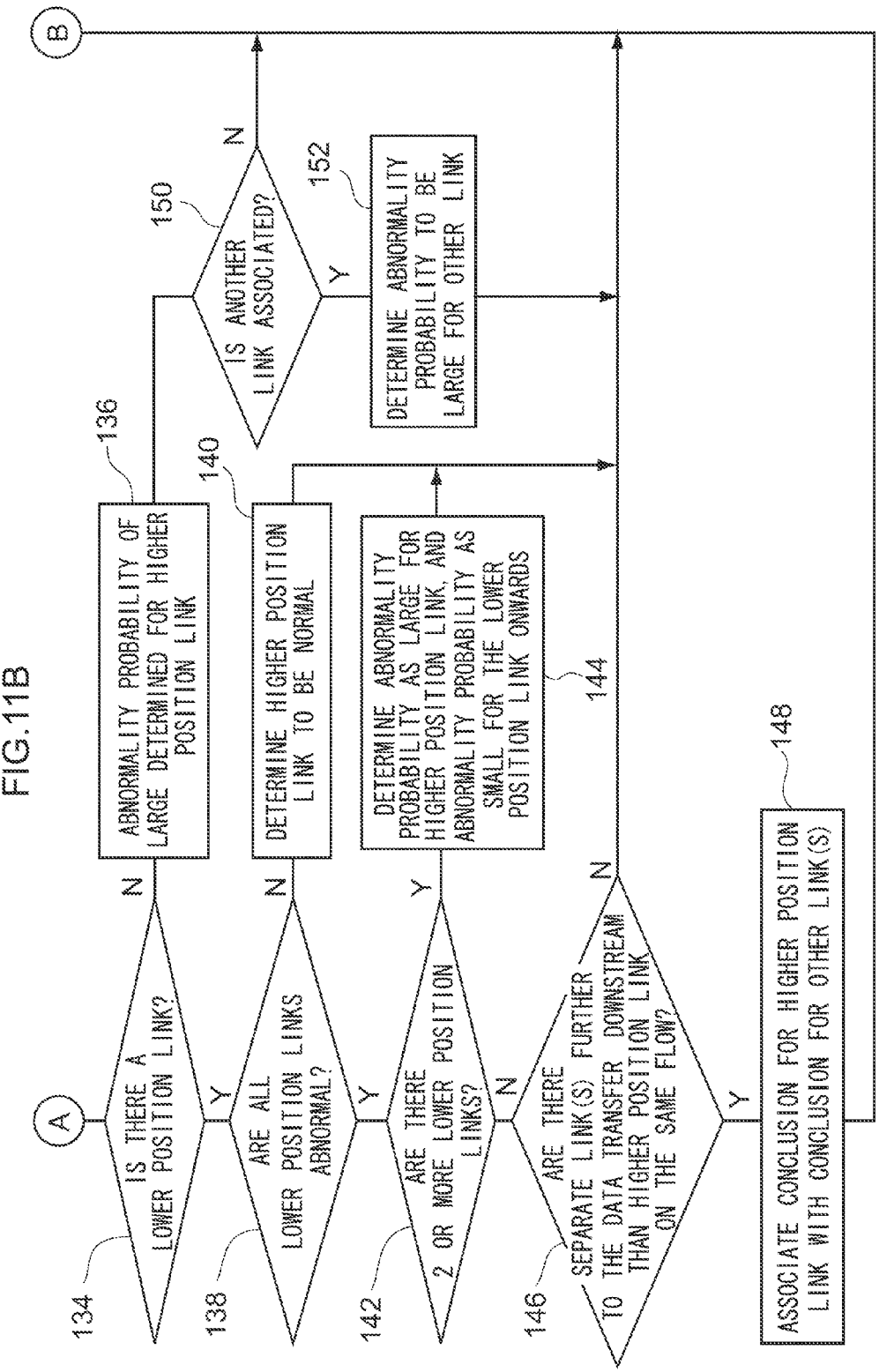

FIG.12B

TOPOLOGY (LINK) DATA

| SW-ID | OUTPUT PORT | ADJACENT SW-ID | INPUT PORT |
|---|---|---|---|
| OFS1 | 1 | OFS3 | 1 |
| OFS3 | 2 | OFS5 | 1 |

FIG.12C

FLOW DATA OF OFS1

| FLOW ID | TRANSMISSION SOURCE IP | DESTINATION IP | OUTPUT PACKET NUMBER | |
|---|---|---|---|---|
| 1 | C1 | S1 | 1000 | ~s |
| 2 | S1 | C1 | 1000 | ~t |

FIG.12D

FLOW DATA OF OFS5

| FLOW ID | TRANSMISSION SOURCE IP | DESTINATION IP | OUTPUT PACKET NUMBER | |
|---|---|---|---|---|
| 1 | C1 | S1 | 1000 | ~u |
| 2 | S1 | C1 | 1000 | ~v |

FIG.12E

FLOW DATA OF OFS3

| FLOW ID | TRANSMISSION SOURCE IP | DESTINATION IP | OUTPUT PACKET NUMBER | |
|---|---|---|---|---|
| 1 | C1 | S1 | 1000 | ~w |
| 2 | S1 | C1 | 1000 | ~y |

FIG.13B

TOPOLOGY (LINK) DATA

| SW-ID | OUTPUT PORT | ADJACENT SW-ID | INPUT PORT |
|---|---|---|---|
| OFS1 | 1 | OFS3 | 1 |
| OFS3 | 2 | OFS5 | 1 |

FIG.13C

FLOW DATA OF OFS1

| FLOW ID | TRANSMISSION SOURCE IP | DESTINATION IP | OUTPUT PACKET NUMBER | |
|---|---|---|---|---|
| 1 | C1 | S1 | 1000 | ~s |
| 2 | S1 | C1 | 500 | ~t |

FIG.13D

FLOW DATA OF OFS5

| FLOW ID | TRANSMISSION SOURCE IP | DESTINATION IP | OUTPUT PACKET NUMBER | |
|---|---|---|---|---|
| 1 | C1 | S1 | 500 | ~u |
| 2 | S1 | C1 | 500 | ~v |

FIG.13E

FLOW DATA OF OFS3

| FLOW ID | TRANSMISSION SOURCE IP | DESTINATION IP | OUTPUT PACKET NUMBER | |
|---|---|---|---|---|
| 1 | C1 | S1 | 500 | ~w |
| 2 | S1 | C1 | 500 | ~y |

FIG.14B  EDGE DATA MANAGEMENT

| EDGE ID | ADJACENT SW-ID | ADJACENT SWITCH PORT |
|---|---|---|
| a.b.c.e | OFS1 | 1 |
| a.b.c.d | OFS5 | 3 |

FIG.14C  PAST (PREVIOUS NORMAL TIME) TOPOLOGY (LINK) DATA

| SW-ID | OUTPUT PORT | ADJACENT SW-ID | INPUT PORT |
|---|---|---|---|
| OFS1 | 1 | OFS3 | 1 |
| OFS3 | 2 | OFS5 | 1 |

FIG.14D  PAST (PREVIOUS NORMAL TIME) FLOW PATH DATA (NODE)

| FLOW ID | NODE 1 | NODE 2 | NODE 3 | NODE 4 | NODE 5 |
|---|---|---|---|---|---|
| 1 | C1 | OFS1 | OFS3 | OFS5 | S1 |
| 2 | S1 | OFS5 | OFS3 | OFS1 | C1 |

FIG.14E  PAST (PREVIOUS NORMAL TIME) FLOW PATH DATA (PORTS)

| FLOW ID | NODE 1 | NODE 2 | NODE 3 | NODE 4 |
|---|---|---|---|---|
| 1 | 1 | 1 | 2 | 3 |
| 2 | 1 | 1 | 1 | 2 |

|  | L1 | L2 | L3 | L4 | L5 | L6 | L7 |
|---|---|---|---|---|---|---|---|
| F1 | NG | NG | NG | NG | — | — | — |
| F3 | — | — | — | G | G | G | G |
| L1 |  |  |  |  |  |  |  |
| L2 |  |  |  |  |  |  |  |
| L3 |  |  |  |  |  |  |  |
| L4 | LARGE← | LARGE | LARGE← | LARGE |  |  |  |
|  |  |  |  | NORMAL | NORMAL | NORMAL | NORMAL |
| CONCLUSION | LARGE | LARGE | LARGE | NORMAL | NORMAL | NORMAL | NORMAL |

FIG. 18A

TOPOLOGY (LINK DATA) MANAGEMENT TABLE

| SWITCH ID | OUTPUT PORT ID | ADJACENT SWITCH ID | ADJACENT SWITCH INPUT PORT ID |
|---|---|---|---|
| OFS1 | 3 | OFS3 | 1 |
| OFS1 | 4 | OFS4 | 2 |
| OFS2 | 3 | OFS4 | 1 |
| OFS2 | 4 | OFS3 | 2 |
| OFS3 | 3 | OFS4 | 3 |
| OFS3 | 4 | OFS5 | 1 |
| OFS4 | 4 | OFS5 | 2 |

FIG. 18B

EDGE (SERVER OR CLIENT) DATA MANAGEMENT TABLE

| EDGE IP ADDRESS | ADJACENT SWITCH ID | ADJACENT SWITCH CONNECTION PORT ID |
|---|---|---|
| 10.25.245.11 | OFS5 | 3 |
| 10.25.245.12 | OFS1 | 1 |
| 10.25.245.13 | OFS1 | 2 |
| 10.25.245.14 | OFS2 | 1 |
| 10.25.245.15 | OFS2 | 2 |

FIG. 19

FLOW DATA MANAGEMENT TABLE

| FLOW ID | TRANSMISSION SOURCE IP ADDRESS | DESTINATION IP ADDRESS | OUTPUT PACKET NUMBER (MAXIMUM VALUE) | OUTPUT PACKET NUMBER (MINIMUM VALUE) |
|---|---|---|---|---|
| 1 | 10.25.245.11 | 10.25.245.12 | 1000 | 1000 |
| 2 | 10.25.245.12 | 10.25.245.11 | 1000 | 1000 |
| 3 | 10.25.245.11 | 10.25.245.13 | 500 | 500 |
| 4 | 10.25.245.13 | 10.25.245.11 | 1000 | 500 |
| 5 | 10.25.245.11 | 10.25.245.14 | 1000 | 1000 |
| 6 | 10.25.245.14 | 10.25.245.11 | 1000 | 1000 |
| 7 | 10.25.245.11 | 10.25.245.15 | 500 | 500 |
| 8 | 10.25.245.15 | 10.25.245.11 | 1000 | 500 |

TOPOLOGY (LINK) DATA

| SW-ID | OUTPUT PORT | ADJACENT SW-ID | INPUT PORT |
|---|---|---|---|
| OFS1 | 3 | OFS3 | 1 |
| OFS3 | 4 | OFS5 | 1 |

FIG.20C
FLOW DATA OF OFS1

| FLOW ID | TRANSMISSION SOURCE IP | DESTINATION IP | OUTPUT PACKET NUMBER |
|---|---|---|---|
| 1 | 10.25.245.11 | 10.25.245.12 | 1000 |
| 2 | 10.25.245.12 | 10.25.245.11 | 1000 |
| 3 | 10.25.245.11 | 10.25.245.13 | 1000 |
| 4 | 10.25.245.13 | 10.25.245.11 | 1000 |

FIG.20D
FLOW DATA OF OFS5

| FLOW ID | TRANSMISSION SOURCE IP | DESTINATION IP | OUTPUT PACKET NUMBER |
|---|---|---|---|
| 1 | 10.25.245.11 | 10.25.245.12 | 1000 |
| 2 | 10.25.245.12 | 10.25.245.11 | 1000 |
| 3 | 10.25.245.11 | 10.25.245.13 | 1000 |
| 4 | 10.25.245.13 | 10.25.245.11 | 1000 |

FIG.20E
FLOW DATA OF OFS3

| FLOW ID | TRANSMISSION SOURCE IP | DESTINATION IP | OUTPUT PACKET NUMBER |
|---|---|---|---|
| 1 | 10.25.245.11 | 10.25.245.12 | 1000 |
| 2 | 10.25.245.12 | 10.25.245.11 | 1000 |
| 3 | 10.25.245.11 | 10.25.245.13 | 1000 |
| 4 | 10.25.245.13 | 10.25.245.11 | 1000 |

TOPOLOGY (LINK) DATA

| SW-ID | OUTPUT PORT | ADJACENT SW-ID | INPUT PORT |
|---|---|---|---|
| OFS1 | 3 | OFS3 | 1 |
| OFS3 | 4 | OFS5 | 1 |

FIG.21C

FLOW DATA OF OFS1

| FLOW ID | TRANSMISSION SOURCE IP | DESTINATION IP | OUTPUT PACKET NUMBER |
|---|---|---|---|
| 1 | 10.25.245.11 | 10.25.245.12 | 500 |
| 2 | 10.25.245.12 | 10.25.245.11 | 1000 |
| 3 | 10.25.245.11 | 10.25.245.13 | 500 |
| 4 | 10.25.245.13 | 10.25.245.11 | 1000 |

FIG.21D

FLOW DATA OF OFS5

| FLOW ID | TRANSMISSION SOURCE IP | DESTINATION IP | OUTPUT PACKET NUMBER |
|---|---|---|---|
| 1 | 10.25.245.11 | 10.25.245.12 | 500 |
| 2 | 10.25.245.12 | 10.25.245.11 | 500 |
| 3 | 10.25.245.11 | 10.25.245.13 | 500 |
| 4 | 10.25.245.13 | 10.25.245.11 | 500 |

FIG.21E

FLOW DATA OF OFS3

| FLOW ID | TRANSMISSION SOURCE IP | DESTINATION IP | OUTPUT PACKET NUMBER |
|---|---|---|---|
| 1 | 10.25.245.11 | 10.25.245.12 | 500 |
| 2 | 10.25.245.12 | 10.25.245.11 | 1000 |
| 3 | 10.25.245.11 | 10.25.245.13 | 500 |
| 4 | 10.25.245.13 | 10.25.245.11 | 1000 |

FIG.22

FLOW DATA MANAGEMENT TABLE

| FLOW ID | TRANSMISSION SOURCE IP ADDRESS | DESTINATION IP ADDRESS | OUTPUT PACKET NUMBER (MAXIMUM VALUE) | OUTPUT PACKET NUMBER (MINIMUM VALUE) |
|---|---|---|---|---|
| 1 | 10.25.245.11 | 10.25.245.12 | 500 | 500 |
| 2 | 10.25.245.12 | 10.25.245.11 | 1000 | 500 |
| 3 | 10.25.245.11 | 10.25.245.13 | 500 | 500 |
| 4 | 10.25.245.13 | 10.25.245.11 | 1000 | 500 |
| 5 | 10.25.245.11 | 10.25.245.14 | 1000 | 1000 |
| 6 | 10.25.245.14 | 10.25.245.11 | 1000 | 1000 |
| 7 | 10.25.245.11 | 10.25.245.15 | 1000 | 1000 |
| 8 | 10.25.245.15 | 10.25.245.11 | 1000 | 1000 |

FIG.23

FLOW STATE MANAGEMENT TABLE

| CONNECTION ID | IP ADDRESS (ONE SIDE) | IP ADDRESS (REVERSE SIDE) | TRANSMITTED PACKET NUMBER | DIFFERENCE VALUE OF TRANSMITTED PACKETS | RECEIVED PACKET NUMBER | DIFFERENCE VALUE OF RECEIVED PACKETS | DETERMINATION RESULT |
|---|---|---|---|---|---|---|---|
| 1 | 10.25.245.11 | 10.25.245.12 | 500 | 0 | 1000 | 500 | NG |
| 2 | 10.25.245.11 | 10.25.245.13 | 500 | 0 | 1000 | 500 | NG |
| 3 | 10.25.245.11 | 10.25.245.14 | 1000 | 0 | 1000 | 0 | G |
| 4 | 10.25.245.11 | 10.25.245.15 | 1000 | 0 | 1000 | 0 | G |

TOPOLOGY (LINK) DATA

| SW-ID | OUTPUT PORT | ADJACENT SW-ID | INPUT PORT |
|---|---|---|---|
| OFS1 | 3 | OFS3 | 1 |
| OFS3 | 4 | OFS5 | 1 |

FIG.24C

FLOW DATA OF OFS1

| FLOW ID | TRANSMISSION SOURCE IP | DESTINATION IP | OUTPUT PACKET NUMBER |
|---|---|---|---|
| 1 | 10.25.245.11 | 10.25.245.12 | 500 |
| 2 | 10.25.245.12 | 10.25.245.11 | 1000 |
| 3 | 10.25.245.11 | 10.25.245.13 | 500 |
| 4 | 10.25.245.13 | 10.25.245.11 | 1000 |

FIG.24D

FLOW DATA OF OFS5

| FLOW ID | TRANSMISSION SOURCE IP | DESTINATION IP | OUTPUT PACKET NUMBER |
|---|---|---|---|
| 1 | 10.25.245.11 | 10.25.245.12 | 500 |
| 2 | 10.25.245.12 | 10.25.245.11 | 1000 |
| 3 | 10.25.245.11 | 10.25.245.13 | 500 |
| 4 | 10.25.245.13 | 10.25.245.11 | 1000 |

FIG.24E

FLOW DATA OF OFS3

| FLOW ID | TRANSMISSION SOURCE IP | DESTINATION IP | OUTPUT PACKET NUMBER |
|---|---|---|---|
| 1 | 10.25.245.11 | 10.25.245.12 | 500 |
| 2 | 10.25.245.12 | 10.25.245.11 | 1000 |
| 3 | 10.25.245.11 | 10.25.245.13 | 500 |
| 4 | 10.25.245.13 | 10.25.245.11 | 1000 |

FIG.25

FLOW DATA MANAGEMENT TABLE

| FLOW ID | TRANSMISSION SOURCE IP ADDRESS | DESTINATION IP ADDRESS | OUTPUT PACKET NUMBER (MAXIMUM VALUE) | OUTPUT PACKET NUMBER (MINIMUM VALUE) |
|---|---|---|---|---|
| 1 | 10.25.245.11 | 10.25.245.12 | 500 | 500 |
| 2 | 10.25.245.12 | 10.25.245.11 | 1000 | 1000 |
| 3 | 10.25.245.11 | 10.25.245.13 | 500 | 500 |
| 4 | 10.25.245.13 | 10.25.245.11 | 1000 | 1000 |
| 5 | 10.25.245.11 | 10.25.245.14 | 500 | 500 |
| 6 | 10.25.245.14 | 10.25.245.11 | 1000 | 1000 |
| 7 | 10.25.245.11 | 10.25.245.15 | 500 | 500 |
| 8 | 10.25.245.15 | 10.25.245.11 | 1000 | 1000 |

FIG.26

FLOW STATE MANAGEMENT TABLE

| CONNECTION ID | IP ADDRESS (ONE SIDE) | IP ADDRESS (REVERSE SIDE) | TRANSMITTED PACKET NUMBER | DIFFERENCE VALUE OF TRANSMITTED PACKETS | RECEIVED PACKET NUMBER | DIFFERENCE VALUE OF RECEIVED PACKETS | DETERMINATION RESULT |
|---|---|---|---|---|---|---|---|
| 1 | 10.25.245.11 | 10.25.245.12 | 500 | 0 | 1000 | 0 | NG |
| 2 | 10.25.245.11 | 10.25.245.13 | 500 | 0 | 1000 | 0 | NG |
| 3 | 10.25.245.11 | 10.25.245.14 | 500 | 0 | 1000 | 0 | NG |
| 4 | 10.25.245.11 | 10.25.245.15 | 500 | 0 | 1000 | 0 | NG |

FIG.27B

EDGE DATA MANAGEMENT

| EDGE ID | ADJACENT SW-ID | ADJACENT SWITCH PORT |
|---|---|---|
| 10.25.245.12 | OFS1 | 1 |
| 10.25.245.11 | OFS5 | 3 |
| 10.25.245.13 | OFS1 | 2 |

FIG.27C

TOPOLOGY (LINK) DATA

| SW-ID | OUTPUT PORT | ADJACENT SW-ID | INPUT PORT |
|---|---|---|---|
| OFS1 | 3 | OFS3 | 1 |
| OFS3 | 2 | OFS5 | 1 |

FIG.27D

PAST (PREVIOUS NORMAL TIME) FLOW PATH DATA (NODE)

| ID | NODE 1 | NODE 2 | NODE 3 | NODE 4 | NODE 5 |
|---|---|---|---|---|---|
| 1 | 10.25.245.11 | OFS5 | OFS3 | OFS1 | 10.25.245.12 |
| 2 | 10.25.245.12 | OFS1 | OFS3 | OFS5 | 10.25.245.11 |
| 3 | 10.25.245.11 | OFS5 | OFS3 | OFS1 | 10.25.245.13 |
| 4 | 10.25.245.13 | OFS1 | OFS3 | OFS5 | 10.25.245.11 |

FIG.27E

PAST (PREVIOUS NORMAL TIME) FLOW PATH DATA (PORTS)

| ID | NODE 1 | NODE 2 | NODE 3 | NODE 4 |
|---|---|---|---|---|
| 1 | 1 | 1 | 1 | 1 |
| 2 | 1 | 3 | 4 | 3 |
| 3 | 1 | 1 | 1 | 2 |
| 4 | 1 | 3 | 4 | 3 |

FIG.28

FLOW DATA MANAGEMENT TABLE

| FLOW ID | TRANSMISSION SOURCE IP ADDRESS | DESTINATION IP ADDRESS | OUTPUT PACKET NUMBER (MAXIMUM VALUE) | OUTPUT PACKET NUMBER (MINIMUM VALUE) |
|---|---|---|---|---|
| 1 | 10.25.245.11 | 10.25.245.12 | 500 | 500 |
| 2 | 10.25.245.12 | 10.25.245.11 | 1000 | 1000 |
| 3 | 10.25.245.11 | 10.25.245.13 | 500 | 500 |
| 4 | 10.25.245.13 | 10.25.245.11 | 1000 | 1000 |
| 5 | 10.25.245.11 | 10.25.245.14 | 500 | 500 |
| 6 | 10.25.245.14 | 10.25.245.11 | 1000 | 1000 |
| 7 | 10.25.245.11 | 10.25.245.15 | 500 | 500 |
| 8 | 10.25.245.15 | 10.25.245.11 | 1000 | 1000 |

FIG.29

FLOW STATE MANAGEMENT TABLE

| CONNECTION ID | IP ADDRESS (ONE SIDE) | IP ADDRESS (REVERSE SIDE) | TRANSMITTED PACKET NUMBER | DIFFERENCE VALUE OF TRANSMITTED PACKETS | RECEIVED PACKET NUMBER | DIFFERENCE VALUE OF RECEIVED PACKETS | DETERMINATION RESULT |
|---|---|---|---|---|---|---|---|
| 1 | 10.25.245.11 | 10.25.245.12 | 500 | 0 | 1000 | 0 | NG |
| 2 | 10.25.245.11 | 10.25.245.13 | 500 | 0 | 1000 | 0 | NG |
| 3 | 10.25.245.11 | 10.25.245.14 | 500 | 0 | 1000 | 0 | NG |
| 4 | 10.25.245.11 | 10.25.245.15 | 500 | 0 | 1000 | 0 | NG |

OBSTRUCTION DETERMINATION DEVICE

CROSS-REFERENCE TO RELATED APPLICATION

This application is based upon and claims the benefit of priority of the prior Japanese Patent Application No. 2013-098546, filed on May 8, 2013, the entire contents of which are incorporated herein by reference.

FIELD

The present invention relates to technology for determining whether or not an obstruction has occurred on a data transfer path between client devices, transfer devices, and a server device.

BACKGROUND

Hitherto, plural open flow switches OFS1 of the OFS5 have been employed for communication of packets between plural clients C1 to C4 and a server S1. When such communication is performed, communication of the packets is not possible when, for example, an obstruction has occurred on a link between switch OFS4 and OFS5. In such cases, there is a need to find out on which link the obstruction has occurred. Therefore, passive monitors have hitherto been employed to collate packets and identify obstruction locations.

However, depending on the placement location of the passive monitor, sometimes analysis of an obstruction is not possible. Namely, as illustrated in FIG. 32A, when a passive monitor is provided between the server S1 and the switch OFS5, the passive monitor is able to receive packets from the transfer path of all of the switches OFS. The passive monitor can accordingly determine an obstruction between switch OFS4 and switch OSF5. However, as illustrated in FIG. 32B, a case may be considered in which the passive monitor is provided between the client C1 and the switch OFS1. When an obstruction occurs between the switch OFS4 and the switch OFS5, the passive monitor provided between the client C1 and the switch OFS1 cannot receive packets that have passed through between the switch OSF4 and the switch OSF5. The obstruction location can therefore not be identified in such a case.

The placement location of a passive monitor is therefore a location that enables obstruction analysis.

RELATED PATENT DOCUMENTS

Japanese Patent Application Laid-Open (JP-A) No. 2011-146982

SUMMARY

According to an aspect of the embodiments, a non-transitory recording medium having stored therein an obstruction determination program for causing a computer to execute a obstruction determination process, the obstruction determination process including determining the presence or absence of an abnormality for each of a plurality of transfer paths on which a plurality of transfer devices are provided for performing transfer of data between a server device and a plurality of respective client devices, with a plurality of the individual transfer devices positioned on each of the transfer paths, the obstruction determination process comprising:

(a) based on connection data received from each of the plurality of transfer devices, which indicates which of each of the transfer devices is connected to which device among the server device, the plurality of client devices or the plurality of transfer devices, determining whether or not the connection data has been received from a plurality of transfer devices connected to a non-transmitting transfer device that is a transfer device that is not transmitting the connection data;

(b) in cases in which it is determined at (a) that the connection data has been received from a plurality of the transfer devices connected to the non-transmitting transfer device, based on transfer path identification data that has been received from each of the plurality of transfer devices connected to the non-transmitting transfer device and that identifies the transfer path on which the transfer device is positioned, identifying a non-transmitting transfer device transfer path that is a transfer path on which the non-transmitting transfer device is positioned; and (c) taking each of the plurality of transfer paths as an identified transfer path, and, based on transfer volume data that is received from a plurality of transfer devices positioned on the identified transfer path and that is transfer volume data of data transferred by each of the transfer devices, determining for each of the identified transfer paths whether or not an obstruction has occurred on the identified transfer path, and in cases in which the identified transfer path is the non-transmitting transfer device transfer path identified at (b), employing the transfer volume data that has been received from another transfer device positioned on the non-transmitting transfer device transfer path as the transfer volume data of the non-transmitting transfer device to determine whether or not an obstruction has occurred on the identified transfer path.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A illustrates a topology management table, FIG. 3B illustrates a past topology management table, and FIG. 3C is a diagram illustrating an obstruction link management table.

FIG. 4 is a diagram illustrating an edge data management table.

FIG. 5 is a diagram illustrating a flow data management table.

FIG. 6 is a diagram illustrating a flow state management table.

FIG. 7A illustrates a flow path data table (nodes), and FIG. 7B is a diagram illustrating a flow path data table (output ports).

FIG. 8A illustrates a past flow path data table (nodes), and FIG. 8B is a diagram illustrating a past flow path data table (output ports).

FIG. 10 is a flow chart illustrating an example of flow state determination processing of step 90 of FIG. 9.

FIG. 11A and FIG. 11B is a flow chart illustrating an example of obstruction location identification processing of step 92 of FIG. 9.

FIG. 12A to FIG. 12E are diagrams to explain processing in a case in which collation of flow data and topology data from one individual switch is not possible.

FIG. 13A to FIG. 13E are diagrams illustrating another result of processing in a case in which collation of flow data and topology data from one individual switch is not possible.

FIG. 14A to FIG. 14E are diagrams illustrating a result of processing in a case in which flow data has been lost at plural consecutive switches.

FIG. 16A to FIG. 16C are diagrams to explain contents of obstruction location identification processing at step 92 of FIG. 9.

FIG. 18A is a diagram illustrating an example of a topology data management table and FIG. 18B is a diagram illustrating an example of an edge data management table, each table being held by the monitoring device of FIG. 17.

FIG. 19 is a diagram illustrating an example of a flow data management table held by the monitoring device of FIG. 17.

FIG. 20A to FIG. 20E are diagrams illustrating an example of a case in which all flows are normal, however flow data cannot be collated from switch OFS3.

FIG. 21A to FIG. 21E are diagrams illustrating an example of a case in which flow data cannot be collated from switch OFS3, and a link obstruction has occurred between switches OFS3 and OSF5.

FIG. 22 is a diagram illustrating a flow data management table in a case in which maximum values and minimum values of packet numbers differ from each other.

FIG. 23 is a diagram illustrating a flow state management table in a case in which maximum values and minimum values of packet numbers differ from each other.

FIG. 24A to FIG. 24E are diagrams of an example of a case in which flow data cannot be collated from switch OFS3, and a disconnection obstruction has occurred due to server overload.

FIG. 25 is a diagram illustrating a flow data management table in a case in which packet numbers have different values in an upwards direction and a downwards direction.

FIG. 26 is a diagram illustrating a flow state management table in a case in which packet numbers have different values in an upwards direction and a downwards direction.

FIG. 27A to FIG. 27E are diagrams illustrating an example of a case in which flow data cannot be collated from the 2 switches of switch OFS1 and switch OFS3.

FIG. 28 is a diagram illustrating a flow data management table in a case in which packet numbers have different values in an upwards direction and a downwards direction.

FIG. 29 is a diagram illustrating a flow state management table in a case in which packet numbers have different values in an upwards direction and a downwards direction.

DESCRIPTION OF EMBODIMENTS

Detailed explanation follows regarding an example of an exemplary embodiment of technology disclosed herein, with reference to the drawings.

Figure 1:
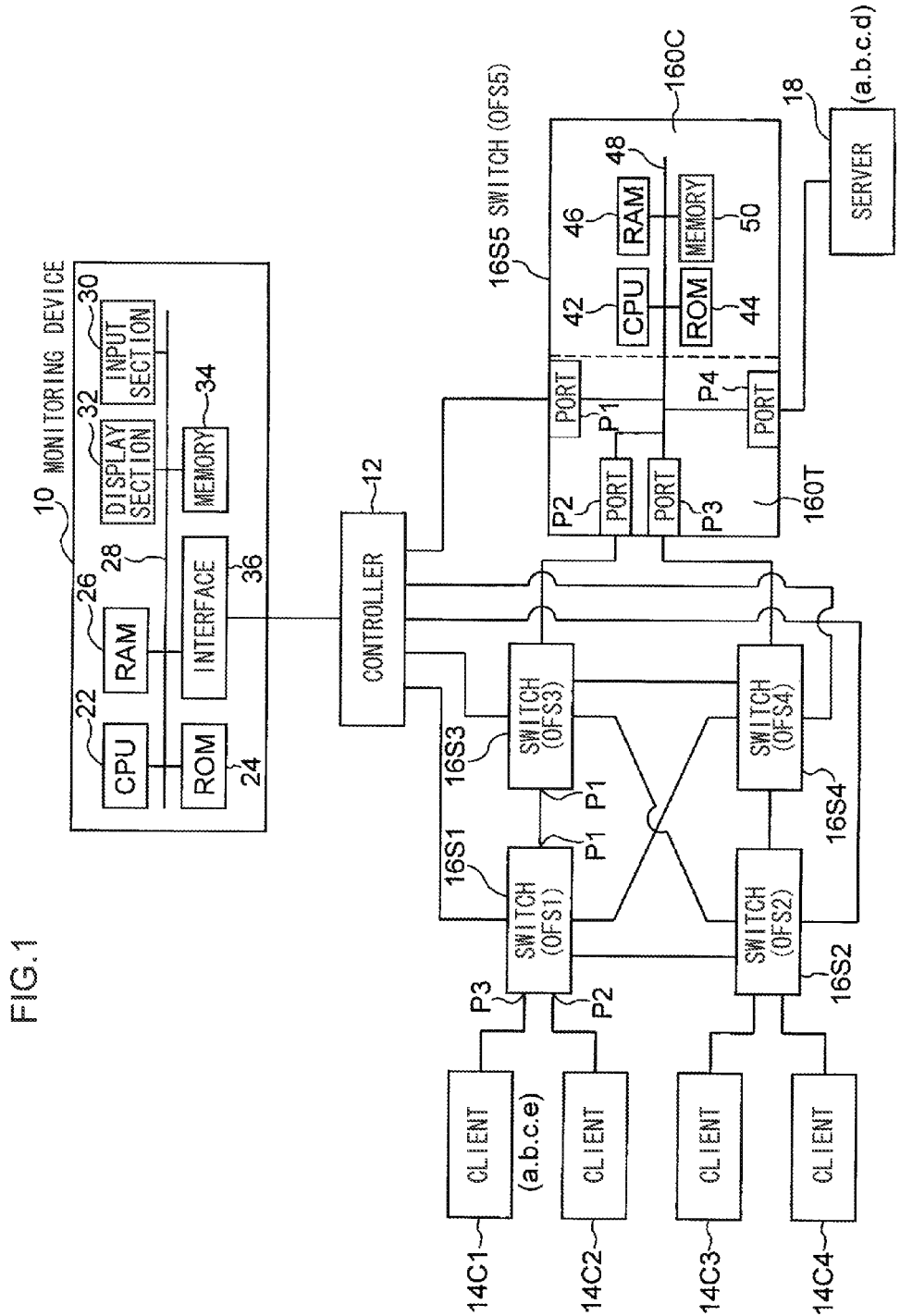
FIG. 1 is a block diagram illustrating a monitoring system of an exemplary embodiment.

FIG. 1 illustrates a monitoring system including a monitoring device 10. The monitoring device 10 is connected to a controller 12. In FIG. 1 there are also plural, for example 5, open-flow switches (referred to below as switches) 16S1 to 16S5 provided between plural, for example 4, clients 14C1 to 14C4 and a single server 18. The 2 clients 14C1, 14C2 are connected to the switch 16S1. The 2 clients 14C3, 14C4 are connected to the switch 16S2. The switch 16S1 and the switch 16S2 are connected together, and the switch 16S1 is connected to the switches 16S3, 16S4. The switch 16S2 is connected to the switches 16S3, 16S4. The switch 16S3 is connected to the switch 16S4. The switches 16S3, 16S4 are connected to the switch 16S5. The switch 16S5 is connected to the server 18. The switches 16S1 to 16S5 are connected to the controller 12. Plural switches are accordingly positioned on a data transfer path between each of the clients 14C1 to 14C4 and the server 18.

The above monitoring system is an example of an obstruction determination system, described later. The monitoring device 10 is an example of an obstruction determination device of technology disclosed herein. The switches are examples of transfer devices of technology disclosed herein.

The monitoring device 10 includes a Central Processing Unit (CPU) 22, Read Only Memory (ROM) 24 and Random Access Memory (RAM) 26, that are mutually connected through a bus 28. An input section 30, a display section 32, a memory 34, and an interface 36 are also connected to the bus 28. The controller 12 is connected to the interface 36. The controller 12 is an example of an instruction device, described later.

Figure 2A:
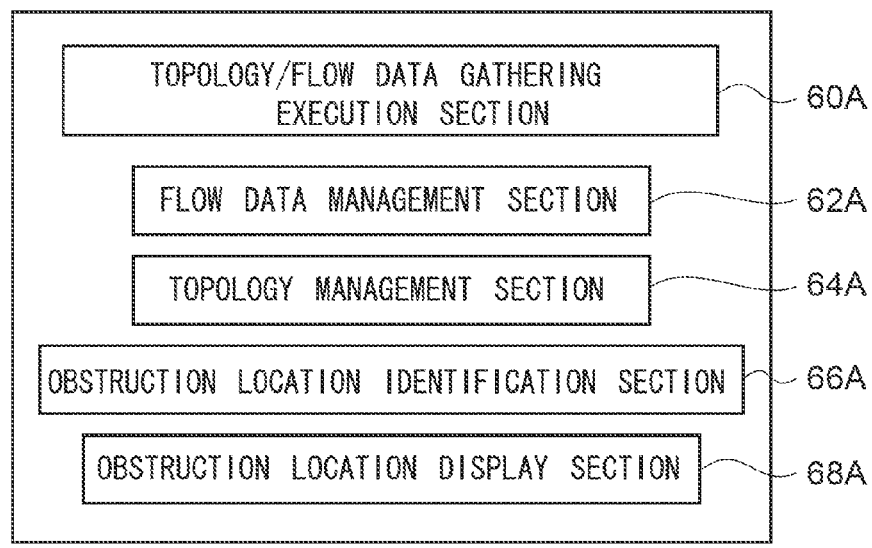
FIG. 2A is a diagram illustrating a monitoring program.
Figure 2B:
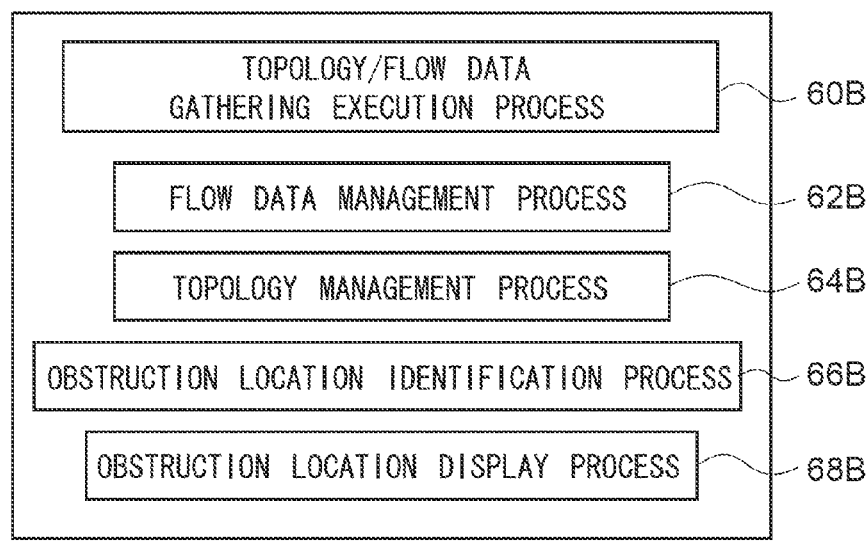
FIG. 2B is a diagram illustrating a monitoring process.

A monitoring program is stored in the ROM 24. The monitoring program, as illustrated in FIG. 2A, includes a topology/flow data collation execution section 60A, a flow data management section 62A, and a topology management section 64A. The monitoring program also includes an obstruction location identification section 66A, and an obstruction location display section 68A. Thus, as illustrated in FIG. 2B, a monitoring process includes a topology/flow data collation execution process 60B, a flow data management process 62B, and a topology management process 64B. The monitoring process also includes an obstruction location identification process 66B and an obstruction location display process 68B. The CPU 22 functions as each of the sections 60A to 68A by executing the above processes 60B to 68B.

Various tables (FIG. 3A to FIG. 8B), described later, are provided in the memory 34 of the monitoring device 10.

The switches 16S1 to 16S5 are configured similarly to each other, and so explanation follows of the configuration of the switch 16S5, with explanation of the other switches omitted. The switch 16S5 is provided with a transfer system 160T that transfers packets and a control system 160C that transmits data through the controller 12, described later, to the monitoring device 10. The control system 160C includes a CPU 42, ROM 44, RAM 46 and memory 50. These components are mutually connected through a bus 48. The transfer system 160T is equipped with ports P1 to P4 connected to the bus 48. The switch 16S5 is connected through the port P1 to the controller 12. The switch 16S5 is connected through the port P2 to the switch 16S3. The switch 16S5 is connected through the port P3 to the switch 16S4. The switch 16S5 is connected through the port P4 to the server 18. The switch 16S5 receives packets from the switch 16S3 at the port P2, and transfers the packets through the port P4 to the server 18. Similarly, the packets are received from the server 18 at the port P4 and the received packets are transferred through the port P2 to the switch 16S3. The other switches 16S1 to 16S4 also similarly transfer packets to other switches or clients through their own ports.

FIG. 3A illustrates a topology (link data) management table. The topology (link data) management table is stored with switch ID, output port ID, adjacent switch ID and adjacent switch input port ID. Inter-switch communication is performed (using an LLDP protocol) between the switches 16S1 to 16S5. When such communication is performed, each of the switches 16S1 to 16S5 transmits its own ID, for example the switch 16S1 transmits OFS1. Each of the switches 16S1 to 16S5 also transmit each port ID to switch transfer destinations to indicate through which of their own ports packets are being transferred. Each of the switches 16S1 to 16S5 is accordingly aware of which of their own ports is connected to which port of the adjacent switch that is the switch adjacent to the port. Each of the switches 16S1 to 16S5 hold this data. As described later, the monitoring device 10 instructs each of the switches through the controller 12 to transmit data (first topology data) of their switch ID, output port ID, adjacent switch ID and adjacent switch input port ID. In response to such an instruction, each of the switches transmits this data through the controller 12 to the monitoring device 10. The monitoring device 10 that has received the first topology data stores the switch ID, output port ID, adjacent switch ID and adjacent switch input port ID received from each of the switches 16S1 to 16S5 in the topology (link data) management table (see FIG. 3A).

A past (previous normal time) topology (link data) management table is illustrated in FIG. 3B. The table illustrated in FIG. 3B is similar in configuration to the table of FIG. 3A. However, the table in FIG. 3B is a table storing first topology data based on collated data for a case where there is no obstruction, described later. FIG. 3C illustrates an obstruction link management table. The management table in FIG. 3C is also configured similarly to that of FIG. 3A, however it is stored only with the first topology data related to switches corresponding to links where an obstruction, described later, has occurred.

FIG. 4 illustrates an edge (server or client) data management table. The edge data management table is a table for storing an edge IP address, adjacent switch ID, and connection portion ID of the adjacent switch associated with each other.

The topology (link data) management table illustrated in FIG. 3A is stored with inter-switch data, namely data for each switch illustrating which of their own ports is connected to which port of which adjacent switch (first topology data). In contrast, the edge data management table illustrated in FIG. 4 is a table for storing data (second topology data) of connections between edges and switches that are directly connected to these edges. Namely, the edges are the clients 14C1 to 14C4 and the server 18. Thus as illustrated in FIG. 1, the client 14C1 is directly connected to the switch 16S1. The switch 16S5 is directly connected to the server 18. During communication between the switches and the clients 14C1 to 14C4 or the server 18, the clients 14C1 to 14C4 or the server 18 transmit the IP address of the client or server 18. The switches 16S1, 16S2, 16S5 that are directly connected to the clients 14C1 to 14C4 or the server 18 are accordingly capable of knowing which of their own ports is connected to which of the clients 14C1 to 14C4 or the server 18. The switches 16S1, 16S2, 16S5 that are directly connected to the clients 14C1 to 14C4 or the server 18 hold the second topology data. When the monitoring device 10 instructs transmission of the second topology data through the controller 12, the switches 16S1, 16S2, 16S5 transmit the second topology data to the monitoring device 10 through the controller 12. On receipt of the second topology data, the monitoring device 10 stores the second topology data in the edge data management table illustrated in FIG. 4.

Thus as described above, the switches 16S1 to 16S5 transmit topology data (including the first topology data and the second topology data) to the monitoring device 10. The monitoring device 10 stores the topology data transmitted by each of the switches 16S1 to 16S5 as the first topology data and the second topology data in the topology management table (FIG. 3A) and the edge data management table (FIG. 4) respectively. Based on each of the topology data of the topology management table of FIG. 3A and the edge data management table of FIG. 4, the monitoring device 10 is capable of ascertaining the manner in which the clients 14C1 to 14C4, the switches 16S1 to 16S5 and the server 18 are connected. Namely, the monitoring device 10 is capable of ascertaining through which of the ports of each of the switches the switches 16S1 to 16S5 are connected to which port of which other switch. The monitoring device 10 is also capable of ascertaining which edge (client or server) is connected through which of the ports of switches 16S1, 16S2, 16S5.

The topology data (including the first topology data and second topology data) is an example of connection data of technology disclosed herein.

A flow data management table is illustrated in FIG. 5. Packets are transmitted and received between the clients 14C1 to 14C4 and the server 18 as described above. Namely, for example, in order to transmit some data from the client 14C1 to the server 18, the client 14C1 divides the data and transmits each data obtained by this division as a packet. Each of the packets contains packet data that includes data (IP addresses) of the transmission source and destination of the divided data, and serial data identifying the sequence of each of the divided data. The switches 16S1 to 16S5 also hold a count value (packet number) that counts the number of packets that have been transferred. The packet data and the count value data are referred to collectively as flow data. The switches 16S1 to 16S5 each transmit the flow data to the monitoring device 10 on transmission instruction from the monitoring device 10. For example, plural flow data are transmitted from the switch 16S1. This flow data is, for example, sometimes flow data of packets flowing between the client 14C1 and the server 18, and is sometimes flow data of packets flowing between the client 14C2 and the server 18. The IP addresses of the data transmission source and destination are contained in each of the packet data of the flow data. The packet data may accordingly be classified in the following manner based on the IP addresses of the data transmission source and destination.

First, the monitoring device 10 classifies the packet data received from each of the switches 16S1 to 16S5 into packet data with the same data transmission source and destination. The monitoring device 10 then identifies the switch that transmitted the classified packet data. The monitoring device 10 then identifies the transfer path (flow) of the data from the first topology data (inter-switch connection data) and the second topology data (edge and inter-switch connection data).

The monitoring device 10 allocates a flow ID to each of the flows, and for each flow, extracts the maximum value and the minimum value of the number of packets (count value) transmitted by the switches in the flow that is the number of packets each of the switches output per unit time. The monitoring device 10 then stores the transmission source IP address, the transmission destination IP address, and the maximum value and minimum value of the packet number associated with the flow ID in the flow data management table illustrated in FIG. 5.

The IP address is an example of transfer path identification data of technology disclosed herein. The packet number is an example of transfer volume data of technology disclosed herein.

A flow state management table is illustrated in FIG. 6. The flow state management table is stored with connection IDs, IP addresses (one side), and IP addresses (reverse side). The flow state management table is also stored with transmitted packet numbers and transmitted packet difference values. The flow state management table is also a table for storing received packet numbers and received packet difference values. The flow state management table is also stored with determination results.

The connection IDs are IDs that identify corresponding flows, such as a first flow from a given client to the server, and a second flow from the server to the given client. Namely, the transmission source of the flow with flow ID=1 illustrated in FIG. 5 is the server 18, and the destination is the client 14C1. The transmission source of the flow with flow ID=2 is the client 14C1, and the destination is the server 18. Each flow with 2 such flow IDs differ from each other only in that the transmission source and destination are reversed; both represent transmission of data between the same client and the server. The ID that identifies the corresponding flows is the connection ID. It is apparent from looking at the flows of flow ID=1 and flow ID=2 illustrated in FIG. 5 that the transmission source and destination are either the server 18 or the client 14C1. One device is designated as the device on one side, and the IP address of that device as the IP address (one side), and the other device is designated as the device on the reverse side, and the IP address of that device as the IP address (reverse side). For example, as illustrated in FIG. 6, in the two flows (flow ID=1, 2) identified by the connection ID=1, the IP address (a. b. c. d) of the server 18 is stored as the IP address (one side). The IP address (a. b. c. e) of the client 14C1 is stored as the IP address (reverse side). Thus one side is one out of two flows, and the reverse side is the other flow. When one flow, namely the flow of one side, is transmission, then the other flow is reception. The transmitted packet number in FIG. 6 is the one side flow above, namely flow in the direction from the server 18 toward the client 14C1, and reception is flow in the direction from the client 14C1 toward the server 18. The maximum value in the packet number received from each of the switches on the above flow with flow ID=1 is stored as the transmitted packet number. Similarly, the maximum value in the packet numbers received from each of the switches on the flow of flow ID=2 is stored as the received packet number.

The above processing is performed for each of the connection IDs.

For each of the 2 flows of each packet connection ID, the packet number for each of the switches is the same when data is being transmitted and received in a predetermined state, namely in a normal state. The transmitted packet difference value and the received packet difference value are accordingly 0. In each of the flows identified by the connection ID=1 in FIG. 6, both the transmitted packet difference value and the received packet difference value are 0. It is accordingly clear that the transmission and reception of data is normal in each of the flows identified by the connection ID=1. The normal state is indicated here by "G" being stored in the determination result column.

In a connection ID k, one flow is flow ID=n−1 in FIG. 5, and the other flow is identified by flow ID=n. Whereas the transmitted packet number in one flow is 500, the packet number (received packet number) for the other flow is 1000. Between a given client and given server, the packet number transmitted and received per unit time is substantially the same as, or the transmitted packet number from the client is larger by the transmitted packet number from the server. Thus a normal state exists when the transmitted packet number and the received packet number are the same number for each connection ID. However, in the flow IDs=n−1, n in the connection ID k, there is a received packet number of 1000 for a transmitted packet number of 500. The received packet number is the packet number received by the client from the server. The transmitted packet number is the packet number transmitted to the client from the server. There have accordingly been data of 1000 packets transmitted from the client, but the server has only transmitted data for 500 thereof. There is accordingly a large load on the server, and a state exists in which it is not possible to transmit the same number of packets as the received packets. This is not the predetermined state, namely the normal state. In such cases, since this is abnormal, "NG" is stored as the determination result to indicate an abnormality.

Moreover, the following applies regarding each of the flows of flow ID=3 and 4 identified by the connection ID=2 illustrated in FIG. 6. Whereas the transmitted packet number from the server is 500, the packet number from the client is 1000. It is accordingly clear therefrom that for the flow ID=3 and 4 identified by the connection ID=2, that there is an abnormal state of loading on the server. Moreover, the received packet difference value of the connection ID=2 is stored as 500, rather than 0. This may be caused by the following. The received packet number is a number of packets in a fixed time period. The number of packets of each of the switches is the same in each of the switches when each of the switches is transmitting data in a normal state, and so the received packet difference value should be 0. However, for example, when a line breaks between one of the switches and another directly connected switch, if for example 500 packets have been transmitted up to when the line breaks, then the remaining 500 packets cannot be transmitted due to the break. It is accordingly possible to ascertain that an abnormal state has occurred, such as a line break or the like between switches on a given flow, when the received packet difference value is not 0. NG is accordingly stored as the determination result to indicate an abnormality.

FIG. 7A illustrates a flow path data table (nodes). The flow path data table (nodes) are stored with associated flow IDs, node 1, node 2, node 3, and so on. It is known from the data of the table in FIG. 3A by which of its own ports each of the switches is connected to which port of other switches. Moreover, it is known from the edge data management table of FIG. 4, which of its own ports each of the switches connected to the client or the server employs to connect to the client or the server. Moreover, the devices at the transmission source and destination of each of the flows are known from the flow data management table of FIG. 5. In addition, which switches are switches on a flow identified by a flow ID is known from the packet data as described above. From the above data, for a given flow corresponding to a flow ID, the IP address of the device at the transmission source, the IP address of the device at the destination, and the IDs of switches that transfer data between the two are stored in the flow path data table (node) of FIG. 7A.

A flow path data table (output ports) is illustrated in FIG. 7B. The flow path data table (output ports) is stored with flow IDs, port 1, port 2, and so on associated with each other. The port 1 is stored with the port ID of the port that is connected to the transmission source device in the switch connected to the transmission source device. Port 2 indicates which port of a second switch is connected to a first switch, and is stored with the port ID of the port of the second switch. The IDs of ports are stored similarly for each of the other switches.

Based on the data illustrated in FIG. 7A and FIG. 7B, for each of the flows between the transmission source and the destination, the monitoring device 10 is able to ascertain for each of the switches which of its own ports is connected to which client or which server. Moreover, the monitoring device 10 is also capable of interpreting data regarding which of the ports of other switches each of the switches are connected to.

The tables illustrated in FIG. 8A and FIG. 8B are similar to the table in FIG. 7A and FIG. 7B, however path data of flow in the past (previous normal time) is stored in each of the tables in FIG. 8.

Figure 9:
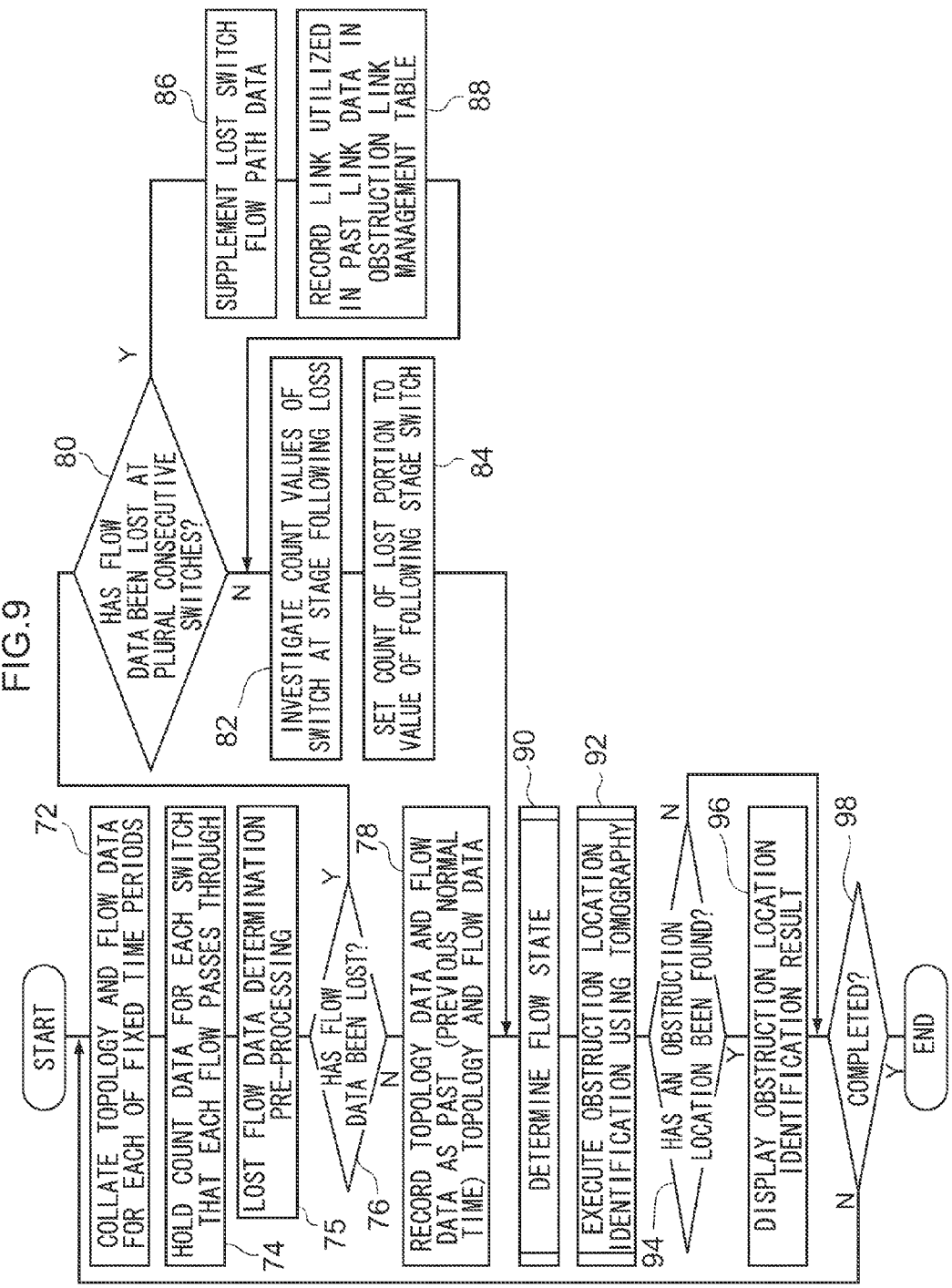
FIG. 9 is a flow chart illustrating an example of monitoring processing of an exemplary embodiment.

Explanation follows regarding operation of the exemplary embodiment. FIG. 9 illustrates an example of monitoring processing executed by the monitoring device 10. At step 72, the topology/flow data collation execution section 60A collates topology data and flow data for each of fixed time periods. Namely, the topology/flow data collation execution section 60A instructs the controller 12 to make each of the switches transmit topology and flow data. The controller 12 instructs each of the switches 16S1 to 16S5 to transmit the above data. Each of the switches 16S1 to 16S5 transmit the above data to the controller 12. The controller 12 transmits the received data to the monitoring device 10. The topology management section 64A updates the topology management table (FIG. 3A) and the edge data management table (FIG. 4) based on the received data. The flow data management section 62A updates the flow data management table (FIG. 5) and columns other than the determination result in the flow state management table of FIG. 6, and updates each of the tables of FIG. 7A and FIG. 7B.

At step 74, the flow data management section 62A holds count data for each of the switches that packets pass through. Namely, count data is held of the count values (packet numbers) of packets in the flow data.

At step 75, the flow data management section 62A executes lost flow data determination pre-processing to determine whether or not there is a switch where flow data has been lost.

Figure 30:
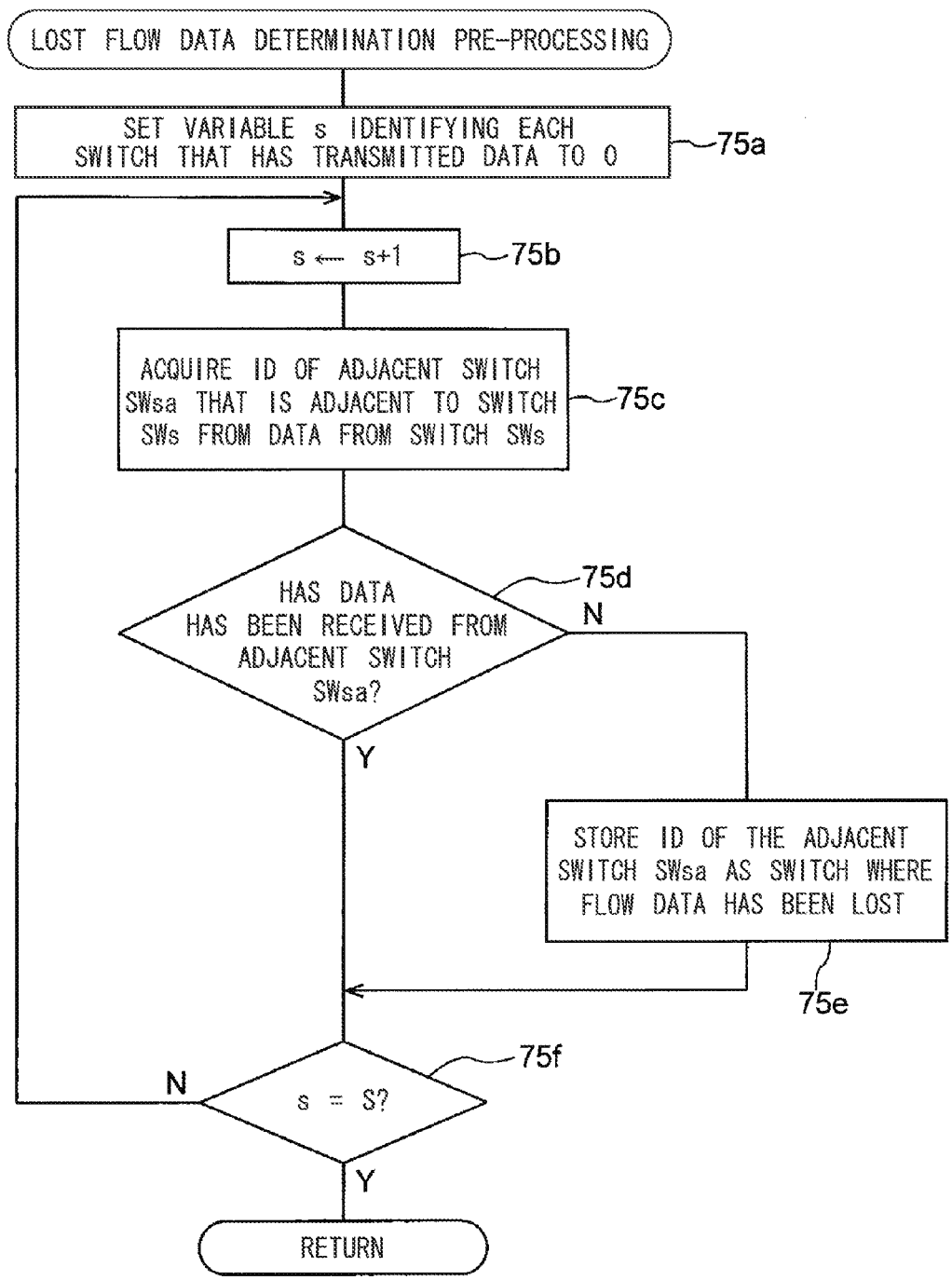
FIG. 30 is a flow chart illustrating an example of a first method of lost flow data determination pre-processing.

There are 2 types of processing for the processing of step 75. A first processing is illustrated in FIG. 30. A second processing illustrated in FIG. 31. One or other of these methods of processing is executed at step 75. Explanation follows regarding each method.

Explanation follows regarding the first processing, with reference to FIG. 30. At step 75a, the flow data management section 62A initializes a variable s that identifies each of the switches that have transmitted topology data and flow data to 0, then at step 75b increments the variable s by 1.

At step 75c, the flow data management section 62A acquires an ID of an adjacent switch SWsa that is directly connected to a switch SWs identified by the variable s from the topology data (first topology data) transmitted from the switch SWs.

At step 75d, the flow data management section 62A determines whether or not the above topology data and flow data has been received from the adjacent switch SWsa. Cases in which it is determined that the above topology data and flow data has not been received from the adjacent switch SWsa are cases in which data could not be received from a switch whose existence has been inferred. Thus at step 75e, the flow data management section 62A stores the ID of the adjacent switch SWsa as the switch where the flow data has been lost. In cases in which affirmative determination is made for the determination result at step 75d, after first executing the processing of step 75e, the flow data management section 62A then at step 75f determines whether or not the variable s is the same as a total number S of the switches to which the data was transmitted. There is the possibility that there is a switch present where the flow data was lost when the variable s is not the same as the total number S, and so processing returns to step 75b, and the above processing (75b to 75f) is re-executed. When affirmative determination is made for the determination result at step 75f, since determination has been made for all switches as to whether or not each switch is a switch where the flow data was lost, the processing of step 75 is ended, and monitoring processing transitions to step 76.

Figure 31:
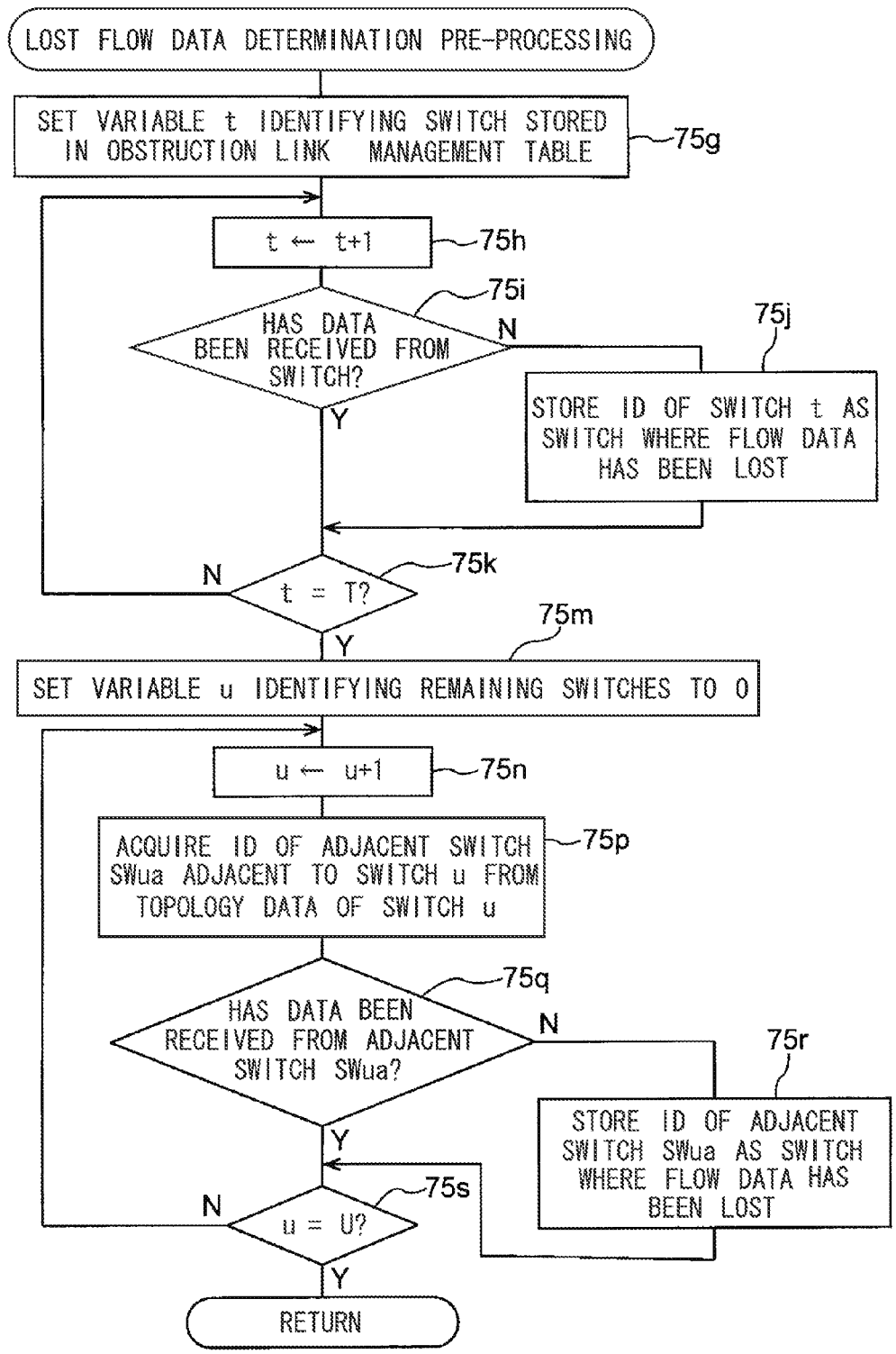
FIG. 31 is a flow chart illustrating an example of a second method of lost flow data determination pre-processing.
Figure 32A:
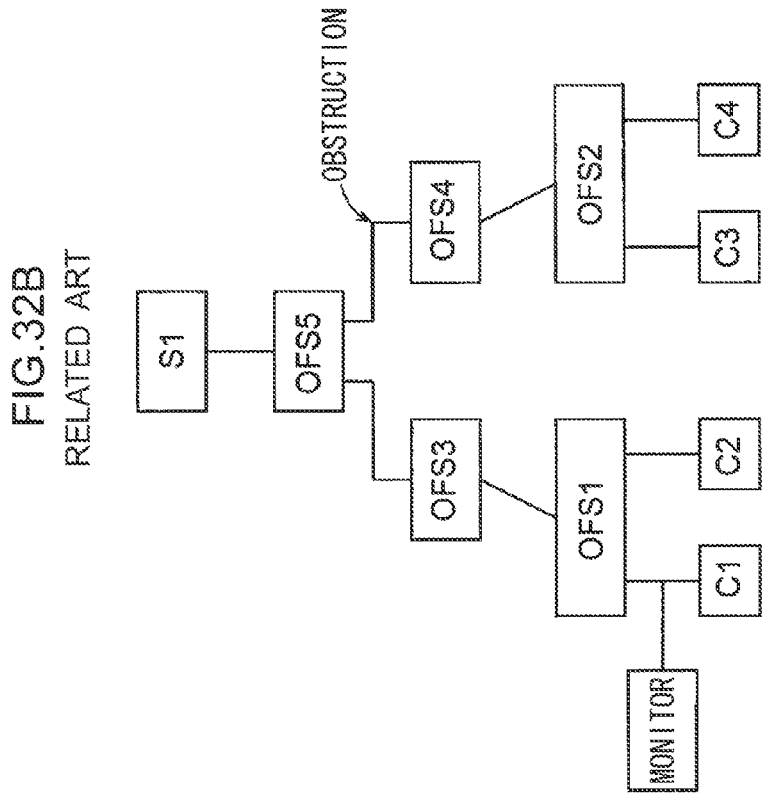
FIG. 32A and FIG. 32B are diagrams illustrating examples of placement of a passive monitor for identifying an obstruction location.
Figure 32B:
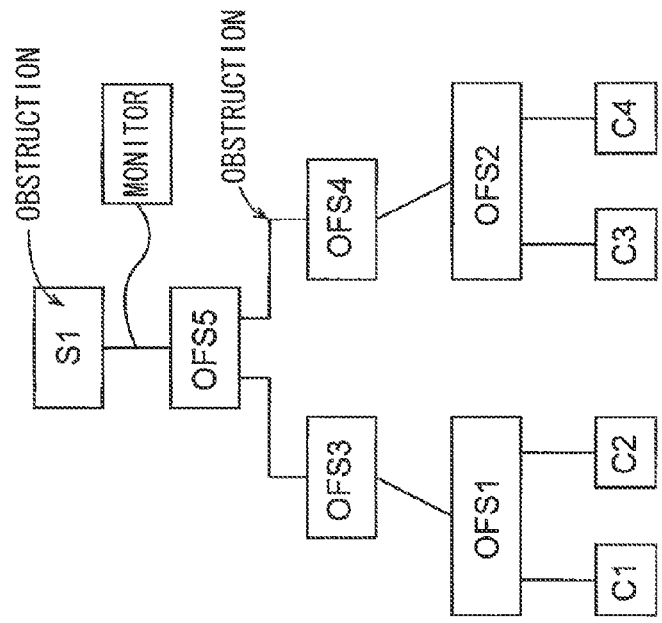

Explanation next follows regarding the second processing, with reference to FIG. 31. At step 75g, the flow data management section 62A initializes a variable t that identifies each of the switches only stored in the obstruction link management table (FIG. 3C) to 0, and at step 75h, increments the variable t by 1.

At step 75i, the flow data management section 62A determines whether or not the above data has been received from a switch SWt identified by variable t. The ID of the switch SWt is stored as a switch where the flow data has been lost in cases in which the above data was not received from the switch SWt. When affirmative determination is made for the determination result of step 75i, or after step 75j has been executed, at step 75k determination is made in the flow data management section 62A as to whether or not the variable t is the same as a total number T of the switches stored in the obstruction link management table. When the variable t is not the same as to the total number T, there are still switches stored in the obstruction link management table remaining for which no determination has yet been made as to whether or not they are switches where flow data is lost, and so processing returns to step 75h, and the above processing (steps 75h to 75k) is re-executed. However, when affirmative determination is made for the determination result at step 75k, at step 75m a variable u that identifies switches remaining that are not switches stored in the obstruction link management table is initialized to 0, and then at step 75n the variable u is incremented by 1.

At step 75p, the flow data management section 62A acquires the ID of an adjacent switch SWua that is adjacent to switch u from the topology data of switch u identified by the variable u. At step 75q, the flow data management section 62A determines whether or not data has been received from the adjacent switch SWua. Cases when data has not been received from the adjacent switch SWua are cases in which data was not received from a switch whose existence has been inferred. In such cases, at step 75r, the ID of the adjacent switch SWua is stored as a switch where flow data was lost. When affirmative determination is made for the determination result of step 75q, or after executing the processing of step 75r, determination is made at step 75s as to whether or not the variable u is the same as to a total number U of the remaining switches. When the variable u is not the same as a total number U, there are still switch(es) in the remaining switches for which determination has not yet been made as to whether or not there is a switch present where flow data was lost, and so processing returns to step 75*n*, and the above processing (steps 75*n* to 75*s*) is re-executed.

When affirmative determination is made as the determination result of step 75, the lost flow data determination pre-processing is ended, and processing transitions to step 76 of FIG. 9.

At step 76, the flow data management section 62A determines whether or not flow data was lost by determining whether or not there are any IDs stored at step 75 as switches where flow data was lost. When negative determination is made at step 76, namely when determination is made that flow data has not been lost, the monitoring processing transitions to step 78. At step 78, determination is made that no obstruction occurred when each of the above data was collated the current time. The topology management section 64A accordingly updates the table illustrated in FIG. 3B from the topology data received the current time, and the flow data management section 62A updates each of the tables of FIGS. 8A and 8B from the flow data received the current time.

When affirmative determination is made for the determination result at step 76, at step 80 the flow data management section 62A determines whether or not flow data was lost at plural consecutive switches. Explanation follows regarding cases in which flow data was lost at plural consecutive switches (cases in which affirmative determination was made as the determination result of step 80), and cases in which flow data was not lost at plural consecutive switches (cases in which negative determination was made as the determination result of step 80). Cases where flow data was not lost at plural connected together switches (cases in which negative determination was made as the determination result of step 80) include the following Case 1 and Case 2. Case 1 is a case in which flow data is only lost at 1 individual switch. Case 2 is a case in which flow data was lost at plural switches, but determination can be made as to whether or not there is a connection between the plural switches.

Figure 12A:
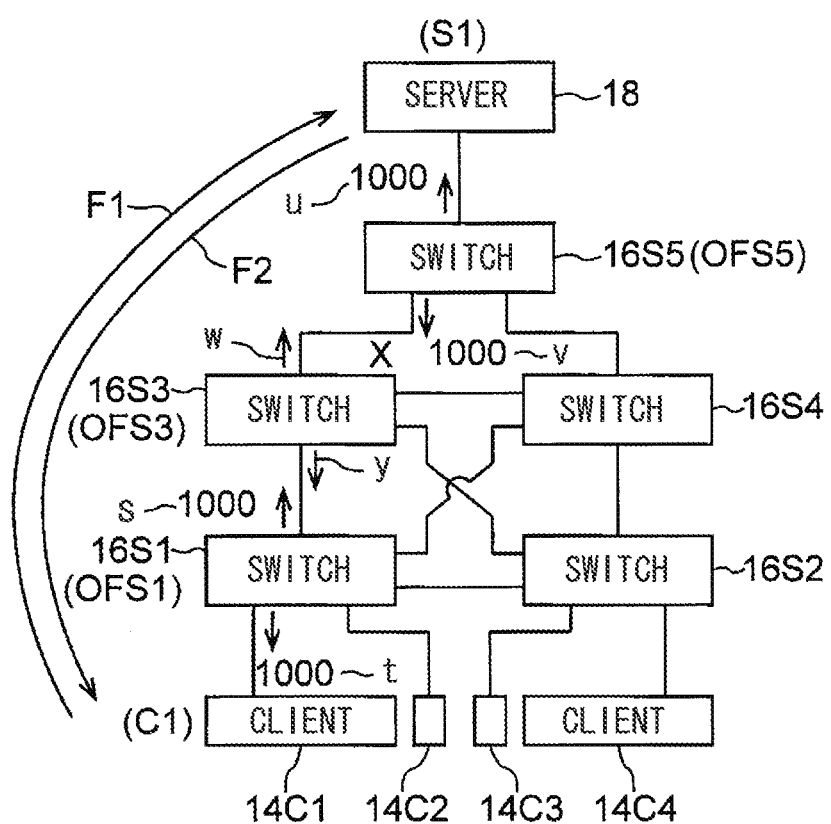

The above Case 1 includes, as illustrated in FIG. 12A, for example, a case where the flow data was not able to be received from the switch 16S3, however the flow data was received from the switches 16S1 and 16S5 on either side of the switch 16S3. Namely, even in cases when the flow data was not received from the switch 16S3 it is still possible to ascertain from the topology data from the switches 16S1 and 16S5 (FIG. 12B) that the switches 16S1 and 16S5 are connected to the switch 16S3. In Case 2, it is not possible to receive the above data from plural switches, however is it sometimes possible to determine from the above topology data whether there is a connection between these switches.

Figure 14A:
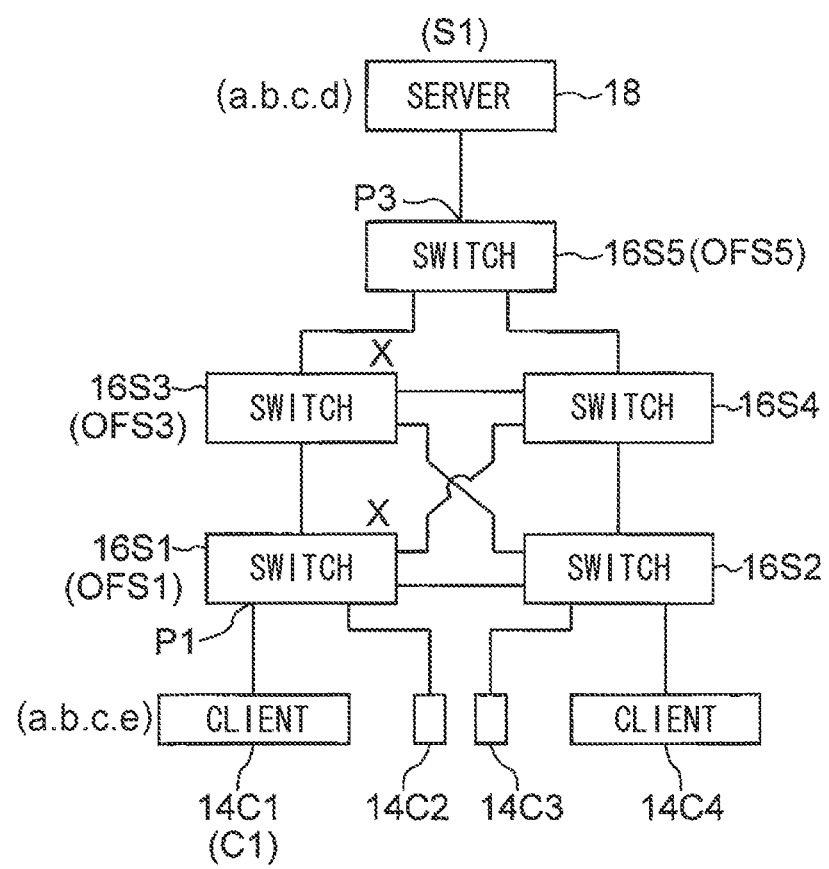

However, when the flow state is lost at plural consecutive switches (affirmative determination is made for the determination result at step 80), then there are for example cases in which it is not possible to receive the above data from the switches 16S1, 16S3, as illustrated in FIG. 14A. The presence of switches 16S1, 16S3 is inferred based on the topology data from the switches 16S5, 16S4, 16S2. However, a situation may also be considered where there is another separate switch present between the switch 16S1 and the switch 16S3, and the above data is not being transmitted from that separate switch either. It is thus not possible in such cases to infer that the switch 16S1 and the switch 16S3 are connected together. The processing of step 80 is an example of determination as to whether or not connection data has been received from plural transfer devices connected to a non-transmitting transfer device of the technology disclosed herein, and is an example of the technology disclosed herein of determination as to whether or not inference can be made.

When negative determination is made as the determination result of step 80, at step 82 the flow data management section 62A investigates count values of a switch at a stage following the loss, and at step 84 sets the count of the lost portion to the value of a following stage switch. Explanation next follows regarding the processing of step 82 and step 84.

When negative determination is made for the determination result of step 80, then as illustrated in FIG. 12A, for example, sometimes even though the above data was not received from the switch 16S3, the above data is received from switch 16S1 and switch 16S5 on either side of switch 16S3. This can be determined from the topology data (the first topology data), as illustrated in FIG. 12B. Namely, the fact that the switches 16S5 and the switch 16S1 are connected to the switch 16S3 can be inferred based on the topology data from the switch 16S1 and the switch 16S5. The switches 16S1, 16S3, 16S5 are accordingly inferred to be connected together consecutively.

In the case of a flow F1 identified by flow ID=1 described above, data (packets) are transmitted from the client 14C1 to the server 18, and in case of the flow F2 identified by flow ID=2, data are transmitted from the server 18 to the client 14C1. As described above, it is accordingly known from the IP addresses of the switches 16S1, 16S5 that the switches 16S1, 16S5 are positioned on the following flows. Namely, it is known that the switches 16S1, 16S5 are positioned on the flow of flow F1 with flow ID=1, and are positioned on the flow of flow F2 with flow ID=2. Then at step 82, the flow data management section 62A first identifies the flows on which the switch 16S3 is positioned between the switches 16S1, 16S5, and the switch 16S3 is identified as described above as being positioned on the flows F1, F2. It is thus understood that in each of the flows F1, F2, packets are transmitted via the switches 16S1, 16S3, 16S5. Identifying at step 82 the flow on which the switches are positioned is an example of identifying a non-transmitting transfer device transfer path of technology disclosed herein.

A switch at a following stage to the switch 16S3 in the flow F1 is the switch 16S5 on the packet transmission direction downstream side. A switch at a following stage to the switch 16S3 on the flow F2 is the switch 16S1 on the packet transmission direction downstream side. At step 82 the flow data management section 62A also investigates the switch count values of the following stage switch in each of the flows. Namely, in the flow F1, the number of output packets of the switch 16S5 is investigated. The output packet number of the switch 16S5 in the flow F1 is 1000, as illustrated in FIG. 12D u. Thus at step 84, as illustrated in 12E w 1000 is set as the output packet number of the switch 16S3 in the flow F1 (flow ID=1).

For the flow F2 (flow ID=2), at step 82 the output packet number is investigated for the switch 16S1. As illustrated in FIG. 12C t, the output packet number of the switch 16S1 in the flow F2 (flow ID=2) is 1000. Thus at step 84, as illustrated in FIG. 12E y, the flow data management section 62A sets 1000 as the output packet number of the switch 16S3 in the flow F2.

Figure 13A:
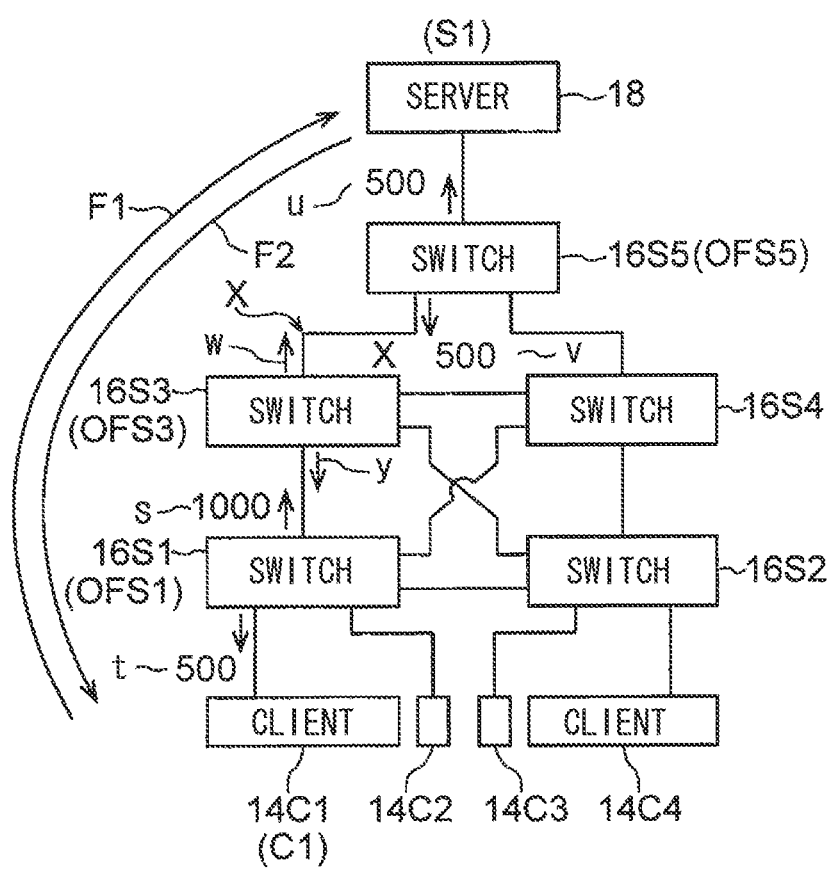

FIG. 13A illustrates an example of a case in which the line is broken between the switch 16S3 and the switch 16S5, in addition to the above data not being receivable from the switch 16S3. Packet transmission is performed at the same time in both the flow F1 and the flow F2. Explanation next follows regarding an example of a case in which the break referred to above occurs while packets are being transmitted in this manner. In the flow F1, there are 1000 individual packets output at the switch 16S1, as illustrated in FIG. 13C s. Namely, the switch 16S1 transmits 1000 individual packets in sequence. The break referred to above occurs during such transmission of the 1000 individual packets by the switch 16S1 and the switch 16S5. Thus in the flow F1, as illustrated in FIG. 13C s, the switch 16S1 outputs 1000 individual packets. However, the above break occurs during transmission. As illustrated in FIG. 13D u, the switch 16S3 accordingly transmits to the server 18 the 500 individual packets received prior to the break occurring. A switch at a following stage thereto in the flow F1 is the switch 16S5. Thus at step 82, the flow data management section 62A investigates the output packet number of the switch 16S5 (FIG. 13D u). At step 84, the flow data management section 62A, as illustrated in FIG. 13E w, sets 500 as the output packet number of the switch 16S3. In the flow F2, only 500 packets arrive from the server (FIG. 13C t). As illustrated in FIG. 13D v, the switch 16S5 only forward transmits the 500 individual packets. Thus due to the above break, the switch 16S1 transmits the packets received prior to the break occurring to the client 14C1, as illustrated in FIG. 13C t, the number thereof being 500. At step 82, the output packet number (500 (see 13C t)) is investigated for the switch 16S1 as the following stage switch in the flow F2. At step 84, the flow data management section 62A sets 500 as the output packet number of the switch 16S3 in the flow F2, as illustrated in FIG. 13E y.

When affirmative determination is made as the determination result of step 80, at step 86, the flow data management section 62A supplements the flow path data of the switch where data was lost. As described above, a case in which the determination result of step 80 is affirmative is for example, as illustrated in FIG. 14A, a case in which the above data is not received from the consecutive switches 16S1, 16S3. In such cases there is a possibility that there is another separate switch present between the switches 16S1, 16S3, and that the above data is also not received from the other separate switch. In such cases, for example, the packets from the client 14C1 sometimes arrive at the server 18 via the switch 16S1, and directly via the switch 16S3 to switch 16S5. Moreover, sometimes packets from the client 14C1 arrive at the switch 16S5 via the switch 16S1, and via other separate switches other than the switch 16S3, and then arrive at the server 18 from the switch 16S5. In such cases it is accordingly not possible to update the tables illustrated in FIG. 7A and FIG. 7B. Namely, for example, in the flow with flow ID=2, packets are being transmitted from the switch 16S1 to the switch 16S3, however sometimes packets are transmitted via another separate switch. Thus the monitoring device 10 is not able to ascertain the state of connection of the switch where the flow data was lost from the flow path data tables (FIG. 7A and FIG. 7B). It is accordingly not possible to select the packet number for following stage switches as described above. As described above, past (previous normal time) flow path data tables, such as those illustrated in FIG. 8A and FIG. 8B, are provided in the memory 34 of the monitoring device 10. By, for example, looking at the path of flow ID=2 in a past normal time flow path data table, it is clear that the switch 16S1 is directly connected to the switch 16S3. Thus at step 86, the flow data management section 62A employs the past flow path data table (see FIG. 8) to supplement the lost connection state of the switches 16S1, 16S3. Namely, the connection state is supplemented for whether there is a connection or not, and to which switch when there is not a connection.

At step 88, the flow data management section 62A stores links employed in past link data in an obstruction link management table. An obstruction has occurred at switches 16S1, 16S3. Hence, the switch ID, output port ID, adjacent switch ID and adjacent switch input port ID for the switch 16S1 and the switch 16S3 are stored in the obstruction link management table of FIG. 3C.

Thus as described above, even in cases in which flow data is lost at plural consecutive switches and the flow is not known, the lost switch flow path data is supplemented based on the past flow path data. It is accordingly known which switches are following stage switches to the lost switches in the flow. Therefore, at step 82, the flow data management section 62A identifies flows on which the lost switches are positioned as described above, and investigates the counts of the following stage switches to the lost switches. For example, in the flow with flow ID=2, a following stage switch is the switch 16S5. The count value of the switch 16S5 is investigated. At step 84, the flow data management section 62A sets the output packet number of the switch 16S5 as the counts of the switches 16S1, 16S3.

On completion of the processing of step 84, the monitoring processing transitions to step 90.

Explanation next follows regarding flow state determination processing of step 90. FIG. 10 illustrates an example of flow state determination processing. At step 102, the flow data management section 62A determines whether or not search for all connections has been completed, based on the connection IDs illustrated in FIG. 6. When negative determination is made as the determination result of step 102, at step 104, the flow data management section 62A acquires the next data from the flow state management table (FIG. 6). Namely, this data includes the transmitted packet number, the transmitted packet difference value, the received packet number, and the received packet difference value.

Figure 15A:
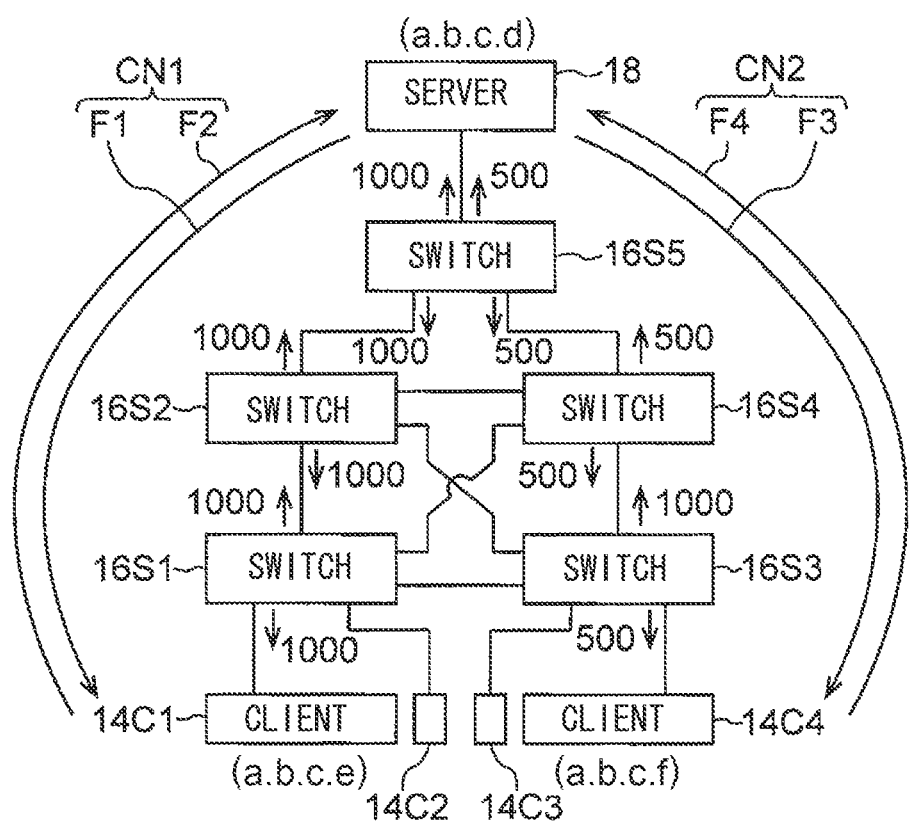
FIG. 15A and FIG. 15B are diagrams to explain contents of flow state determination processing at step 92 of FIG. 9.

At step 106, the flow data management section 62A determines whether or not the transmitted packet difference or the received packet difference is a threshold value or greater. The contents of connection ID=2 in FIG. 6 are illustrated in FIG. 15A. The connection ID=2 identifies flows F3, F4. One side of connection ID=2, namely transmission, corresponds to flow F3; the reverse side, namely reception, corresponds to flow F4. 500 individual packets are transmitted from each of the switches in the flow F3. The transmitted packet difference value in flow F3 is according 0. However, in flow F4 the packet number is 1000 at switch 16S3, while the packet number of switches 16S4, 16S5 is only 500. The difference value of received packets is accordingly 500. In such cases, the determination result of step 106 is accordingly an affirmative determination, and the flow state determination processing transitions to step 112. At step 112, the flow data management section 62A determines that flow F4 is abnormal, and at step 114 stores NG to indicate an abnormality for the determination result.

Figure 15B:
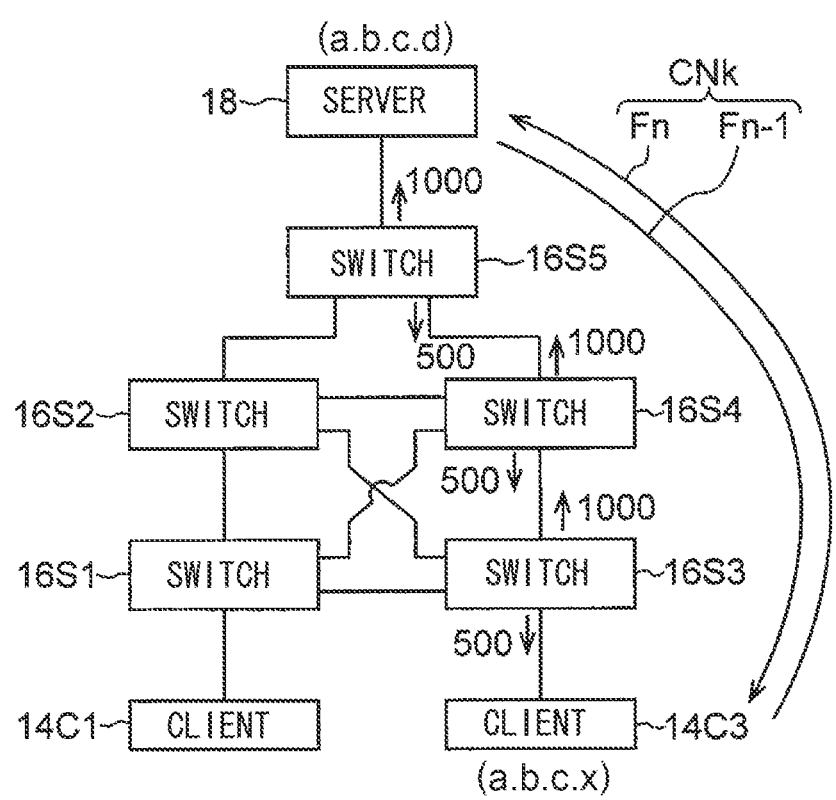

However, when negative determination is made as the determination result at step 106, at step 108, the flow data management section 62A determines whether or not the absolute value of the transmitted packet number–received packet number is a threshold value or greater. The connection ID k in FIG. 6 identifies the flows Fn−1, Fn in FIG. 15B. In contrast to the flow Fn−1 having a packet number of 500 for each of the switches 16S3, 16S4, 16S5, in the flow Fn the packet number is 1000 for each of the switches 16S3, 16S4, 16S5. In such cases affirmative determination is made as the determination result of step 108, and at step 112, the flow data management section 62A determines that the flow is abnormal, and at step 114 stores NG to indicate an abnormality in the determination result column of the connection ID k.

However, in the flows F1, F2 identified by connection ID 1 (FIG. 15A), the packet number is 1000 for each of the switches 16S1, 16S2, 16S5 in flows F1, F2. Thus negative determination is respectively made as the determination result at step 106 and step 108 in such cases, and at step 110 the flow data management section 62A stores G to indicates normal in the determination result column corresponding to the connection ID 1.

The processing of step 90 is an example of determining whether or not an obstruction has occurred on an identified transfer path.

Figure 16A:
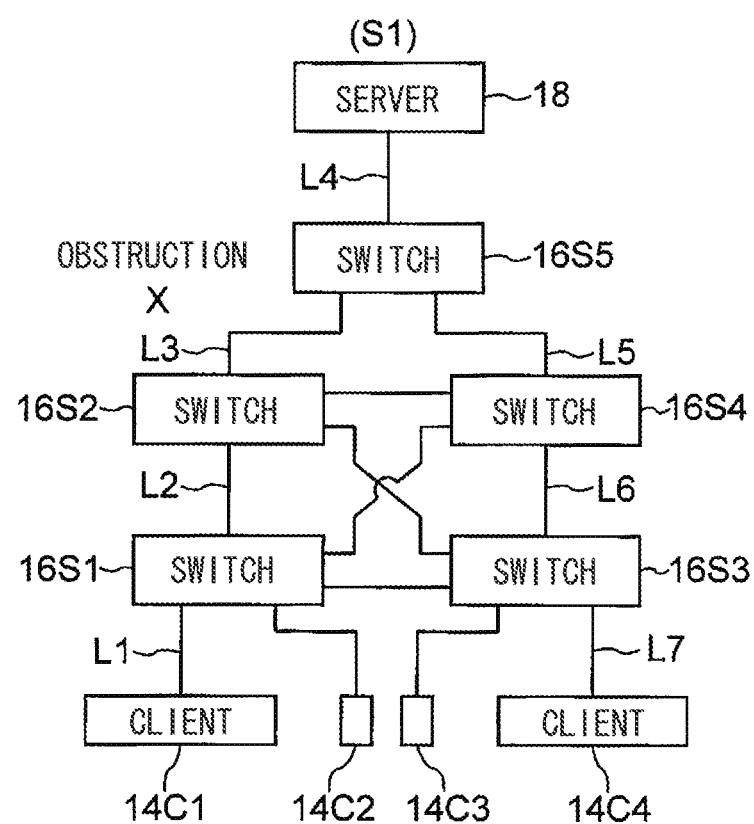

The above processing (steps 72 to 90) accordingly enables acquisition of the data for executing obstruction location identification using network tomography technique. At step 92, the obstruction location identification section 66A executes obstruction location identification processing. FIG. 11 illustrates an example of obstruction location identification processing. At step 122, the obstruction location identification section 66A determines whether or not there is an observation node that has not yet been observed. Observation node refers here to a client or server. When affirmative determination is made for the determination result of step 122, at step 124 the obstruction location identification section 66A maps a flow abnormality determination result to links through which the flow passes. Namely, for example as illustrated in FIG. 16A, the flow F1 is a flow to the client 14C1 that is an observation node. As illustrated in FIG. 16B, the flow F1 has a link L1 present between the client 14C1 and the switch 16S1, and a link L2 present between the switches 16S1, 16S2. There is also a link L3 present between the switches 16S2, 16S5 and a link L4 present between the switch 16S5 and the server 18. At step 124, the obstruction location identification section 66A maps an abnormality determination result onto each of the links corresponding to the flow F1. For example, when an obstruction occurs at link L3 of flow F1 and the flow is determined to be abnormal, as illustrated in FIG. 16C, NG is stored to indicate an abnormality against the links L1, L2, L3, L4 corresponding to the flow F1. The observation node of the flow F3 is the client 14C4. The flow F3 has the link L4 present between the server 18 and the switch 16S5, the link L5 present between the switches 16S4, 16S5, the link L6 present between the switches 16S3, 16S4, and the link L7 present between the client 14C4 and the switch 16S3. Then when the flow F3 is normal, G is stored to indicate normal against the link L4, L5, L6 and L7 corresponding to the flow F3.

At step 126, the obstruction location identification section 66A determines whether or not there are any links through the flow that have not yet been searched. Processing returns to step 122 when negative determination is made as the determination result at step 126, and the above processing (steps 122 to 126) is executed again. However, when affirmative determination is made as the determination result at step 126, then at step 128 the obstruction location identification section 66A selects a link that has not yet been searched, and designates this as a higher position link. Namely, explanation follows regarding the example of flow F1 in FIG. 16A to FIG. 16C. At step 128, first the link L1 is set as the higher position link. Then at step 130, the obstruction location identification section 66A determines whether or not the higher position link is abnormal. In this manner, as illustrated in FIG. 16C, since NG is stored against the link L1 in flow F1, affirmative determination is made at step 130, and the obstruction location identification processing transitions to step 134. At step 134, the obstruction location identification section 66A determines whether or not there is a lower position link.

In this case, a lower position link is a link where an obstruction has not occurred that is positioned on the same flow as the higher position link (in this case the link L1), and is a link other than a link further to the downstream side in the packet transfer direction than the link where an obstruction has occurred. There is a lower position link for the link L1 in the flow F1, and so affirmative determination is made for the determination result at step 134. Obstruction location identification processing then transitions to step 138. At step 138, the obstruction location identification section 66A determines whether or not all the lower position links are abnormal. In the flow F1, all of the lower position link(s) are abnormal, and so affirmative determination is made for the determination result at step 138, and the obstruction location identification processing transitions to step 142. At step 142, the obstruction location identification section 66A determines whether or not there are two or more lower position links. The lower position links are, as stated above, links where an obstruction has not occurred that are positioned on the same flow as the higher position link, and are links other than the links further to the packet transfer direction downstream side than the link where an obstruction has occurred. Only the link L2 fits this definition of lower position link when looking at flow F1. Namely, when the link L3 is broken as described above, the packet number from the switch 16S2 is the same as that from the switch 16S1. However, the packet number is 0 for the switch 16S5 at a different position on the same flow. This thereby enables determination from this data that the link L3 is broken. In such cases the link L3 is not within the definition of lower position link. Similarly the link L4 is not within the definition of lower position link. Thus in the flow F1, there is 1 lower position link, and so negative determination is made for the determination result at step 142.

In cases in which negative determination is made for the determination result at step 142, it is not possible to conclude whether or not the higher position link L1 is abnormal due to an obstruction at a separate link. Therefore at step 146, the obstruction location identification section 66A determines whether or not there are separate link(s) further to the data transfer downstream side than the higher position link on the same flow. The links L3, L4 are present on the flow F1, and so affirmative determination is made at step 146. In cases in which affirmative determination is made for the determination result at step 146, at step 148 the obstruction location identification section 66A associates the conclusion for the higher position link with the conclusions for the other link(s). After step 148 has been executed, the obstruction location identification processing then transitions to step 126. Looking at flow F1, the above processing has been completed for the link L1, however there are still links L2 to L4 present, and so affirmative determination is made at step 126, and at step 128 the obstruction location identification section 66A makes the link L2 the higher position link this time. Negative determination is made at step 134 for the higher position link L2. This is because the link L3 does not fall within the definition of a lower position link. In such cases, at step 136, the obstruction location identification section 66A determines the abnormality probability as large for the higher position link L2. At step 150, the obstruction location identification section 66A determines whether or not another link has been associated. As described above, for the link L1, the link L2 and the link L1 were associated with each other at step 148, and so affirmative determination is made for the determination result at step 150. Then at step 152, the obstruction location identification section 66A determines the abnormality probability as large for the other link, namely the link L1. Thus LARGE representing the large abnormality probability is stored for the link L1 and the link L2, as illustrated in FIG. 16C.

In flow F1, the above processing is then executed for the next link L3. At step 128, the link L3 is made the higher position link. For the link L3, affirmative determination is made for the determination result at step 130, and the determination result of step 134 is also an affirmative determination. This is because the link L4 is normal. At step 142, since only the link L4 is a lower position link to the link L3, negative determination is made at step 142. At step 146, since there is another link L4 present in the same flow further to the data transfer downstream side than the link L3, an affirmative determination is made for the determination result at step 146, and at step 148, the conclusion of the higher position link L3 is associated with the conclusion of the other link L4. The above processing is then executed for the link L4. For the link L4, since there is no lower position link present, a negative determination is made for the determination result at step 134, and the abnormality probability of large is determined for the higher position link at step 136. At step 150, since the link L3 has been associated as described above, an affirmative determination is made for the determination result at step 150, and at step 152, the obstruction location identification section 66A determines that the other link L3 has a large abnormality probability. Thus LARGE is stored corresponding to the link L3 and the link L4 of flow F1.

Explanation next follows regarding the flow F3. The links L4 to L7 in flow F3 are normal, as illustrated in FIG. 16C, and so negative determination is made at step 130 for each of these links, then at step 132 the obstruction location identification section 66A determines the higher position link to be normal, and stores NORMAL to indicate that it is normal.

A negative determination is sometimes made at step 138 in cases other than the example illustrated in FIG. 16. In such cases, at step 140, the obstruction location identification section 66A determines that the higher position link is normal, and stores NORMAL corresponding to the higher position link. Moreover, as another example, sometimes an affirmative determination is made for the processing result at step 142. In such cases, at step 144 the obstruction location identification section 66A determines the higher position link abnormality probability as large, and the abnormality probability as small for the lower position link onwards, storing LARGE or SMALL corresponding to each of the links.

Thus as described above, when an abnormality probability of LARGE, SMALL, or NORMAL has been stored for each of the links on each of the flows, determination at step 126 is negative, and obstruction location identification processing then transitions to step 122. When a negative determination is made for the determination result at step 122, the obstruction location identification processing transitions to step 154. At step 154, the obstruction location identification section 66A tallies the determination results for each of the links with each of the observation nodes as observation points. Namely, as illustrated in FIG. 16C, determination results are tallied for each of the observation nodes. At step 156, the obstruction location identification section 66A determines whether or not there are any links that have not yet been searched. When it is determined that not yet searched links exist, at step 158, the obstruction location identification section 66A determines whether or not a determination of normal has been made for 1 or more observation points. For example, as illustrated in FIG. 16C, both abnormality probabilities NORMAL are stored for the link L5, hence for link L5 affirmative determination is made for the determination result at step 158. At step 160, the obstruction location identification section 66A determines the link L5 to be normal, and stores NORMAL in the conclusion column. When negative determination is made for the determination result at step 158, at step 162 the obstruction location identification section 66A determines whether or not an abnormality probability of large has been determined for one or more observation points. For example, as illustrated in FIG. 16C, for the link L2 an abnormality probability of large has been determined for one or more observation point. Thus an affirmative determination is made for the determination result at step 162, and abnormality probability of large is made as the conclusion of the current link L2, and LARGE identifying the abnormality probability of large is stored in the conclusion column. Note that when negative determination is made for the determination result of step 162, at step 166, the obstruction location identification section 66A determines an abnormality probability of small for the current link, and stores SMALL to identify an abnormality probability of small in the conclusion column.

When obstruction location identification processing has been completed, at step 94 of FIG. 9, the obstruction location display section 68A determines whether or not an obstruction location has been found. When determined that an obstruction location has been found, then at step 96 then an obstruction location identification result is displayed on the display section 32. Note that the obstruction location identification result is not displayed when it is determined that an obstruction location has not been found.

At step 98, determination is made as to whether or not there has been an end instruction, and the current monitoring processing is ended when an end instruction has been input by a user.

Explanation next follows regarding advantageous effects of the present exemplary embodiment.

Firstly, in the above exemplary embodiment, there are occasions when it is not possible to collate flow data from one switch. In such cases, the monitoring device identifies from topology data plural other switches that are connected to the one switch, and sets packet numbers for the other switches positioned on the same transfer path as the packet number of the one switch. The monitoring device is thereby able to ascertain packet numbers for all the switches. Thus based on the packet numbers of each of the switches, the monitoring device is able to determine whether or not an obstruction has occurred on each of the transfer paths. Thus the monitoring device is able to determine for each link whether or not an obstruction has occurred from combinations of the presence or absence of obstructions on each of the transfer paths. Thus the exemplary embodiment exhibits the advantageous effect of enabling obstruction locations to be identified without disposing passive monitors.

Secondly, in the above exemplary embodiment there are occasions when flow data cannot be collated from plural consecutive switches. In such cases, the monitoring device is able to determine whether or not there is a connection between the plural consecutive switches from past data of each link stored when normal packet transfer occurred in the past. The monitoring device accordingly knows the manner in which each of the switches is connected to other devices. For the packet number of plural consecutive switches, the packet number of a one given switch is set for the other switches positioned on the same transfer path. The monitoring device is thereby able to ascertain the packet numbers for all of the switches. The monitoring device is accordingly able to determine whether or not there is an obstruction on each of the transfer paths based on the packet numbers of each of the switches. Thus, the monitoring device is able to determine whether or not an obstruction has occurred on each of the links from combinations of the presence or absence of obstructions on each of the transfer paths. The above exemplary embodiment accordingly exhibits the advantageous effect of enabling obstruction locations to be identified without disposing passive monitors.

Thirdly, the monitoring device stores data of where obstructions occurred in the past between which port of which switch and which port of which other switch in the obstruction link management table. Thus when flow data cannot be collated from a switch, the monitoring device first references the obstruction link management table, and determines which port of the switch from which it was not possible to collate flow data is connected to which port of which other switch. When there is a switch from which it is not possible to collate flow data then there is high probability that an obstruction has occurred in the past. Hence the monitoring device is able to ascertain which port of the switch from which it was not possible to collate flow data is connected to which port of which other switch more quickly than when acquiring all the data in sequence and making a determination.

Explanation next follows regarding modified examples of the present exemplary embodiment.

Firstly, in the above exemplary embodiment, open flow switches are employed as switches, however switches other than open flow switches may be employed.

Secondly, the controller may be omitted, and each of the switches may directly input the above data to the monitoring device.

Thirdly, although packets of following stage switches are investigated in order to supplement packet numbers, the packet numbers may be set by investigating packets of previous stages (on the packet transmission direction upstream side). Namely, packets of any switches positioned on the same flow may be investigated and the packet numbers set therefrom.

Explanation follows regarding an Example.

Figure 17:
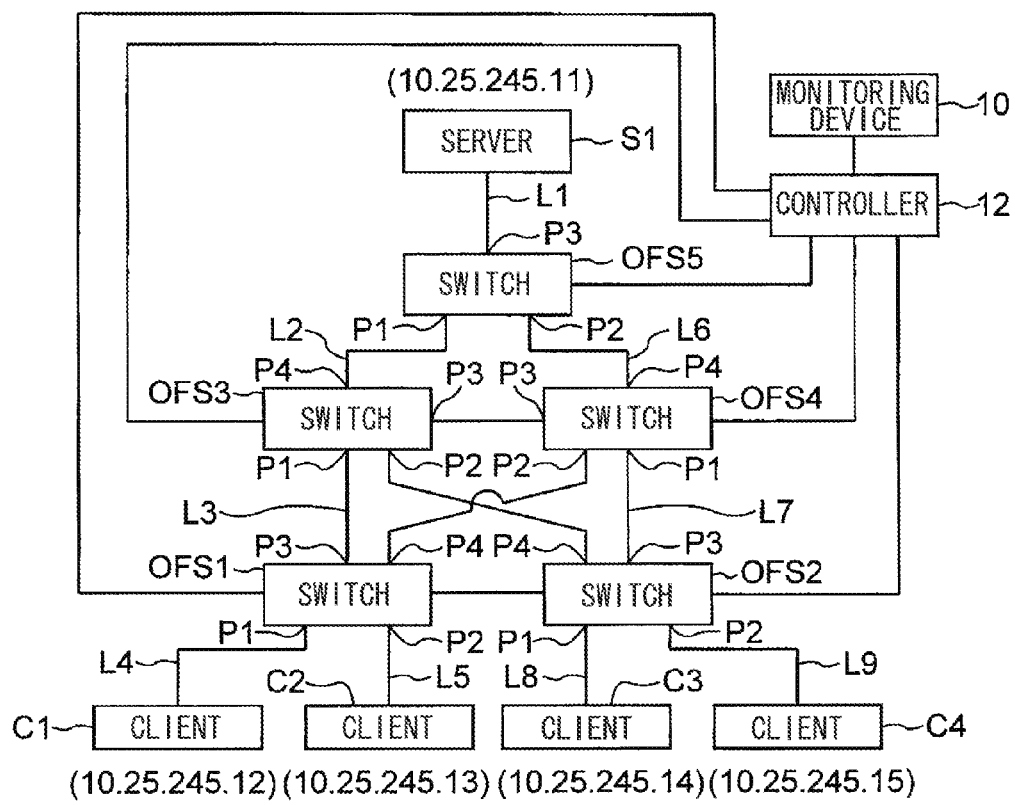
FIG. 17 is a diagram illustrating an example of flows between a server and clients.

FIG. 17 is a diagram illustrating an example of each of flows F1 to F8 between a server S1 and clients C1 to C4 in a first Example. The IP address of the server S1 is 10.25.245.11, and the IP addresses of the clients C1 to C4 are 10.25.245.12, 10.25.245.13, 10.25.245.14 and 10.25.245.15 respectively. Communication is performed between each of the clients C1 to C4 and the server S1. Switches OFS1 to OFS5 are provided between each of the clients C1 to C4 and the server S1. Each of the switches OFS1 to OFS5 is connected through ports P1 to P4 to the other switches OFS1 to OFS5, each of the clients C1 to C4 and the server S1. The numbers 1 to 4 in ports P1 to P4 indicate the port IDs. The switches OFS1 to OFS5 are connected to the monitoring device 10 through the controller 12.

FIGS. 18A and 18B illustrate an example of a topology data management table (FIG. 18A) and an edge data management table (FIG. 18B) held by the monitoring device 10 illustrated in FIG. 17. The topology (link data) management table of FIG. 18A holds, for example, data related to the connection links between each of the switches, such as that the port P3 of the switch OFS1 is connected to the port P1 of the switch OFS3, and that the port P4 of the switch OFS1 is connected to the port P2 of the switch OFS4.

Moreover, the edge (server or client) data management table of FIG. 18B is stored with the following data. Namely, the edge data management table is stored with data to indicate that the server S1 identified by the IP address of 10.25.245.11 is connected to the port P3 of the switch OFS5. It is also stored with data to indicate that the client C1 identified by the IP address of 10.25.245.12 is connected to the port P1 of the switch OFS1. It is also stored with data for the switches OFS1, OFS2, OFS5 that are connected to the server S1 or the clients C1 to C4 to indicate which of their ports are connected to the server S1 or the clients C1 to C4.

FIG. 19 illustrates an example of a flow data management table held in the monitoring device 10 illustrated in FIG. 17. For example, the flow data management table indicates that for flow ID 1, both the maximum and the minimum packet numbers of the flow are 1000 from the server S1 identified by IP address 10.25.245.11 to the client C1 identified by the IP address of 10.25.245.12. It also indicates that both the maximum and the minimum packet numbers are 1000 for the flow ID 2 that is the flow in the reverse direction (in the direction from the client C1 toward the S1). There is similar flow data for between other servers and clients noted therein.

A given flow is determined to be an abnormal flow when the above maximum and minimum values of the packet numbers are different from each other (see for example flow ID 4). Abnormal flow is also determined when there are different values for upward and downward flow.

FIG. 20 illustrates an example in which all the flows are normal, but it is not possible to collate flow data of the switch OFS3. It is known from the collated flow data that the packets of the flow to the server S1 from each of the client C1 and the client C2 are output from the port P3 of the switch OFS1.

Since the port P3 of the switch OFS1 is known from the topology data (FIG. 20B) to be connected to the port P1 of the switch OFS3, next the flow data of the switch OFS3 is searched, however it is not possible to acquire this flow data, as described above.

Figures 20A, 20B:
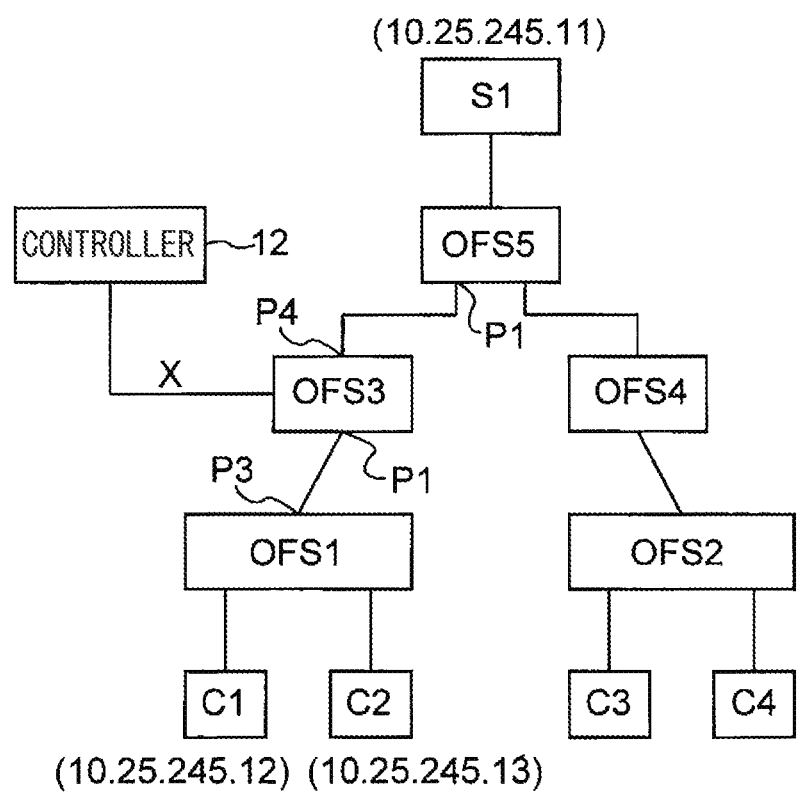
Figures 21A, 21B:
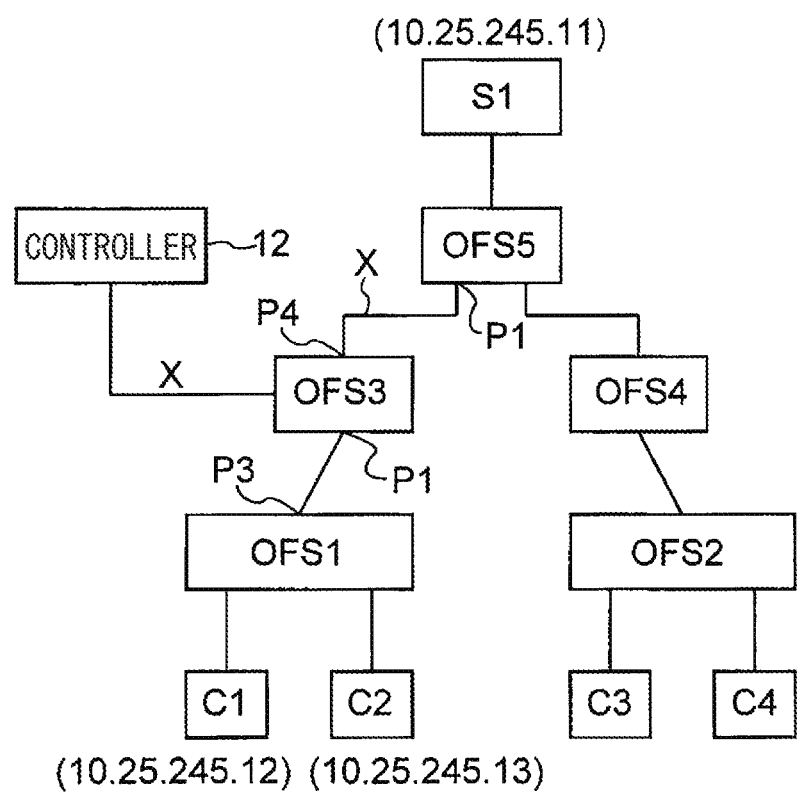
Figures 24A, 24B:
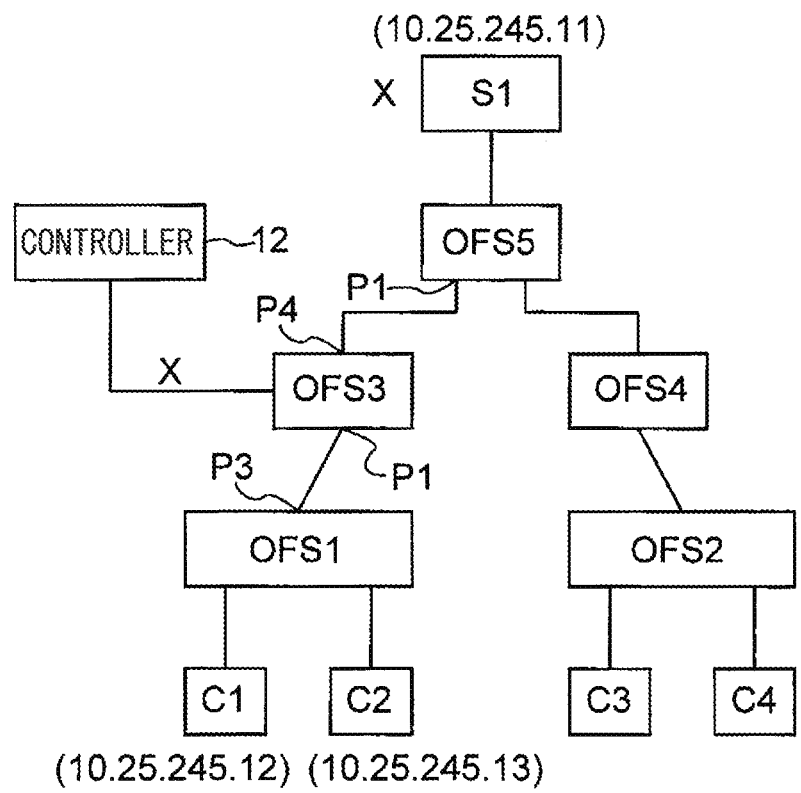
Figure 27A:
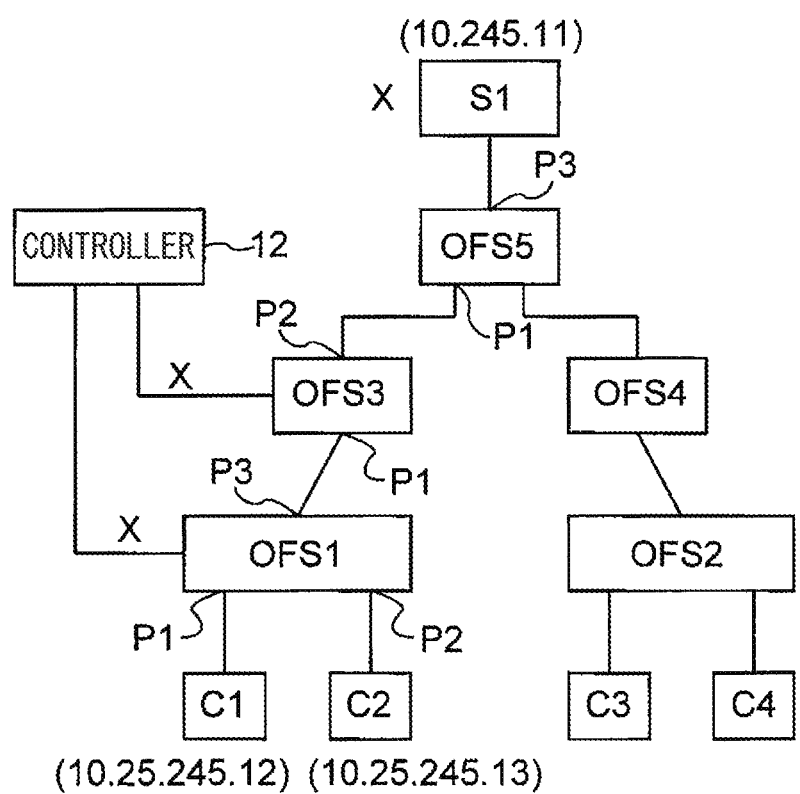

The fact that the input port P1 of the switch OFS5 is connected to the port P4 of the switch OFS3 can be ascertained from the topology data (FIG. 20B). It is accordingly possible to identify that the packets in the flow from each of the client C1 and the client C2 to the server S1 are packets that flow through "switch OFS1→switch OFS3→switch OFS5".

Since the packet numbers of each flow of the switch OFS1 and the switch OFS5 are all 1000, 1000 is therefore set as the packet count of the switch OFS3. The above enables the flow path data from the client C1 and the client C2 to the server S1 to be identified even though it is not possible to collate the flow data of the switch OFS3, thereby enabling the value of the packet number to be set.

FIGS. 21A to 21E illustrate an example of a case in which it is not possible to collate the flow data of the switch OFS3, similarly to in FIG. 20, and in addition an obstruction has occurred at a link between the switch OFS3 and the switch OFS5. From the collated flow data, the packets from each of the client C1 and the client C2 are known to be output from the port P3 of the switch OFS1 in the flow of the server S1. Since it is known from the topology data that the port P3 of the switch OFS1 is connected to the port P1 of the switch OFS3, the flow data of the switch OFS3 is then searched for, however as described above, it is not possible to obtain this flow data.

It is known from the topology data of the switch OFS5 (FIG. 21B) that packets are input through the port P1 of switch OFS5. The fact that the port P1 is connected to the port P4 of the switch OFS3 can be ascertained from current link data, or from link data that is past rather than current due to a link going down, or from obstruction link data (in the illustrated example this is searched from the current topology data). Packets in the flow from each of the client C1 and the client C2 to the server S1 can be identified as passing through "switch OFS1→switch OFS3→switch OFS5".

The flow identified here by flow ID=2 has a switch OFS1 output packet number of 1000 (FIG. 21C), however the packet number of each of the flows of the switch OFS5 is 500 (FIG. 21D). Thus the 500 of the switch OFS5 is set for example as the packet count of the switch OFS3.

In such cases, the maximum and the minimum values of the packet number of the flow data management table, as illustrated in FIG. 22 (see flow ID=2) are different. Thus, as illustrated in the flow state management table of FIG. 23 (see connection ID=1), the received packet difference value is larger than the transmitted packet difference value, and so it is determined that upward and downward flows are both abnormal flows.

In the above manner it is possible to generate flow path data and the packet count value from the client C1 and the client C2 to the server S1 even when flow data of the switch OFS3 cannot be collated, enabling obstruction location(s) to be identified.

FIGS. 24A to 24E illustrate an example of operation in a case in which, similarly to in FIG. 20, it is not possible to collate flow data of the switch OFS3, and in addition a non-communication obstruction has occurred due to overload of the server S1. It can be seen from the collated flow data that packets in the flow from each of the client C1 and the client C2 to the server S1 are output from the port P3 of the switch OFS1.

Since the fact that the port P3 of the switch OFS1 is connected to the port P1 of the switch OFS3 is known from the topology data (FIG. 24B), the flow data of the switch OFS3 is then searched, however as described above, it is not possible to acquire this flow data.

It is known from the topology data of the switch OFS5 (FIG. 24B) that packets are input from the input port P1. The fact that input port P1 of the switch OFS5 is connected to the port P4 of the switch OFS3 can be ascertained from current link data, or from past rather than current link data due to a link going down, or from obstruction link data (in the illustrated example this is searched from the current topology data). It is possible to determine that packets in the flow from each of the client C1 and the client C2 to the server S1 pass through the switch OFS1→switch OFS3→switch OFS5.

As illustrated in the columns of flow IDs=2, 4 of FIG. 24C and FIG. 24D, the packet counts of the switch OFS1 and the switch OFS5 from the clients C1, C2 to the server S1 are 1000. However, as illustrated in the columns of flow IDs=1, 3 of FIG. 24C and FIG. 24D, the packet counts in the respective flows from the server S1 to the clients C1, C2 are each 500. Consequently, as the packet count of the switch OFS3, for example, 500 is set as the packet count from the server S1 to the clients C1, C2, and 1000 is set as the packet count from the clients C1, C2 to the server S1.

In such cases, the values of the upward and downward flow packet numbers in the flow data management table as illustrated in FIG. 25 are different from each other. Thus, as illustrated in the flow state management table of FIG. 26, due to there being fewer transmitted packets in comparison to received packets, determination is made that both the upward and downward flows are abnormal flows due to overload of the server S1.

The above thereby enables the creation of flow path data and packet count values from the client C1 and the client C2 to the server S1 even though it is not possible to collate flow data of the switch OFS3, thereby enabling obstruction location identification to be performed.

FIGS. 27A to 27E illustrate an example of operation in a case in which flow data cannot be collated from plural consecutive switches, for example two switches, the switch OFS1 and the switch OFS3. Moreover, explanation follows regarding a case in which imbalance occurs in upward and downward traffic due to a server obstruction similar to in FIG. 24. It is known from the edge data management table (FIG. 27B) that the client C1 and the client C2 are connected to the switch OFS1.

Therefore, since flow data of the switch OFS1 cannot be collated, it is known from past flow path data when it was possible to collate data normally (FIG. 27D), that there is a connection from the switch OFS1 to the switch OFS3. Note that it may also be determined from the topology data that the output destination of the switch OFS1 is the switch OFS3.

Moreover, since the flow data of the switch OFS3 also cannot be collated, the past flow path data (FIG. 27D) is re-searched, and the connection destination is identified as being the switch OFS5 (the topology data may also be utilized).

The packet number can only be collated at this point for the switch OFS5. The value of the switch OFS5 is accordingly utilized as the packet numbers for the switch OFS1 and the switch OFS3. Namely, as illustrated in FIG. 28, 1000 is set as the value from the client to the server, and 500 is set as the value from the server to the client.

In such cases, as illustrated in FIG. 28, the values of the packet numbers in the upward and downward directions are different from each other in the flow data management table. Thus as illustrated in the flow state management table of FIG. 29, due to there being fewer transmitted packets in comparison to received packets, it is determined that both upward and downward flows are abnormal.

Thus the flow path data and the packet count values from the client C1 and the client C2 to the server S1 can be created even when flow data cannot be collated from plural switches, thereby enabling obstruction location identification to be performed.

Note that even in cases in which there is only a single switch from which flow data cannot be collated, flow data and packet counts may be created by utilizing past flow data as illustrated in FIG. 24.

As explained above, according to the above exemplary embodiment, obstruction location identification is enabled without disposing plural passive monitors even in cases in which flow data cannot be collated from plural open flow switches.

An exemplary embodiment has the advantageous effect of enabling determination of whether or not an obstruction has occurred on a transfer path.

All cited documents, patent applications and technical standards mentioned in the present specification are incorporated by reference in the present specification to the same extent as if the individual cited documents, patent applications and technical standards were specifically and individually incorporated by reference in the present specification.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium having stored therein an obstruction determination program for causing a computer to execute an obstruction determination process for a network including a plurality of transfer devices, the obstruction determination process including determining a presence or absence of an abnormality for each of a plurality of transfer paths on which the plurality of transfer devices are provided for performing transfer of data between a server device and a plurality of respective client devices, with a plurality of the individual transfer devices positioned on each of the plurality of transfer paths, the obstruction determination process comprising:

(a) receiving connection data associated with at least one of the plurality transfer device that is transmitting the connection data, and determining whether the at least one plurality of the transfer device from which the connection data is received is connected to a non-transmitting transfer device based on the received connection data, the non-transmitting transfer device is a transfer device that is not transmitting the connection data associated therewith and whose position information with respect to a topology of the network is unavailable, and connection data associated with a transfer device is a data that indicates connections between the associated transfer device and at least one device selected from a group consisting of the server device, the plurality of client devices and the plurality of transfer devices;

(b) in cases in which it is determined at (a) that the at least one of the plurality transfer device is connected to the non-transmitting transfer device, receiving transfer path identification data associated with the at least one transfer device that is connected to the non-transmitting transfer device, and, based on the received transfer path identification data, supplementing the position information of the non-transmitting transfer device with respect to the topology and identifying a non-transmitting transfer device transfer path that is a transfer path on which the non-transmitting transfer device is positioned, transfer path identification data associated with a transfer device being data that identifies a transfer path on which the associated transfer device is positioned;

(c) identifying the plurality of transfer paths, and for each of the identified transfer paths, receiving transfer volume data associated with transfer devices that are positioned on the identified transfer path, and determining whether an obstruction has occurred on the identified transfer path based on the received transfer volume data, and in cases in which the identified transfer path is the non-transmitting transfer device transfer path identified at (b), determining a transfer volume of the non-transmitting transfer device based on the received transfer volume data associated with transfer device that is positioned on the non-transmitting transfer device transfer path and determining whether an obstruction has occurred on the non-transmitting transfer device transfer path based on the received transfer volume data and the determined transfer volume of the non-transmitting transfer device;

(d), based on the determination result of whether or not the obstruction has occurred for each of the identified transfer paths at (c), determining a connection between a first device and a second device in which the obstruction has occurred, wherein the first device and the second device are each a device selected from the group consisting of the server device, the plurality of client devices and the plurality of transfer devices, and a second device is a device that receives data from the first device through the determined connection;

(e) storing connected device data in a connected device data storage device, wherein the connected device data is data that indicates the devices that are connected by the connection in which the obstruction has occurred; and (f) determining whether or not the transfer device corresponding to the connected device data stored in the connected device data storage device at (e) is the non-transmitting transfer device, and in cases in which it is determined that the transfer device corresponding to the connected device data is the non-transmitting.

2. The non-transitory recording medium of claim 1, the obstruction determination process further comprising: (g) determining whether the obstruction has occurred on the identified transfer path based on a difference in transfer volumes of transfer devices that are positioned on the identified transfer path.

3. The non-transitory recording medium of claim 1, the obstruction determination process further comprising:

(h) determining a difference between a first transfer volume of transfer devices positioned on the first transfer path, which is a transfer path of data from the client device to the server, and a second transfer volume of transfer devices positioned on the second transfer path, which is a transfer path of data from the server to the client device, and determining whether or not an obstruction has occurred on the first transfer path and the second transfer path based on the determined difference.

4. The non-transitory recording medium of claim 1, wherein the transfer devices are open flow switches.

5. The non-transitory recording medium of claim 1, wherein: each of the plurality of transfer devices includes a data transfer device that transfers the data, and a transmission device that transmits identification data that contains the connection data, the transfer path identification data, and the transfer volume data; and the transfer device is the non-transmitting transfer device if the transmission device of the transfer device does not transmit the identification data but the data transfer device of the transfer device transfers the data, or if the data transfer device of the transfer device does not transfer the data.

6. A non-transitory recording medium having stored therein an obstruction determination program for causing a computer to execute an obstruction determination process for a network including a plurality of transfer devices, the obstruction determination process including determining the presence or absence of an abnormality for each of a plurality of transfer paths on which the plurality of transfer devices for performing transfer of data between a server device and a plurality of respective client devices, with a plurality of the individual transfer devices positioned on each of a transfer paths, the obstruction determination process comprising:

(a) receiving connection data associated with at least one of the plurality transfer device that is transmitting the connection data, determining whether or not it is possible to infer that there are more than one non-transmitting transfer devices based on the received connection data and that there are connections among the more than one non-transmitting transfer devices, the non-transmitting transfer devices are transfer devices which are not sending the connection data associated therewith and whose position information with respect to a topology of the network are unavailable, and the connection data associated with a transfer device is a data that indicates connections between the associated transfer device and at least one device selected from a group consisting of the server device, the plurality of client devices and the plurality of transfer devices;

(b) in cases in which it is determined at (a) that it is not possible to make the inference, supplementing the position information of the more than one non-transmitting transfer devices with respect to the topology by supplementing connection data which indicates connections among the more than one non-transmitting transfer devices based on normal connection data, the normal connection data is connection data stored in a storage device in a past when the data was transferred normally, and that indicates connections among transfer devices that are positioned on a transfer path;

(c) based on the normal connection data, identifying a non-transmitting transfer device transfer path that is a transfer path on which is positioned the more than one non-transmitting transfer devices for which the position information has been supplemented at (b); and (d) identifying a plurality of transfer paths, and, for each of the identified transfer paths, receiving transfer volume data associated with transfer devices that are positioned on the identified transfer path, and determining whether or not an obstruction has occurred on the identified transfer path based on the received transfer volume data, and in cases in which the identified transfer path is the non-transmitting transfer device transfer path identified at (c), supplementing the transfer volume data of the non-transmitting transfer device on the non-transmitting transfer device transfer path by the received transfer volume data, and determining whether an obstruction has occurred on the identified transfer path based on the received transfer volume data and the supplemented transfer volume data;

(d), in cases in which it is determined at (a) that the inference is possible, identifying the non-transmitting transfer device transfer path based on transfer path identification data that is received from at least one transfer devices connected to the more than one non-transmitting transfer devices that are positioned on the non-transmitting transfer device transfer path, wherein the transfer path identification data associated with a transfer device is data that identifies a transfer path on which the associated transfer devices is positioned; and (e) based on the determination result of whether or not the obstruction has occurred for each of the identified transfer paths at (d), determining a connection between a first device and a second device in which an obstruction has occurred, wherein the first device and the second device are each a device selected from the group consisting of the server device, the plurality of client devices and the plurality of transfer devices, and a second device is a device that receives data from the first device through the determined connection.

7. The non-transitory recording medium of claim 6, the obstruction determination process further comprising:

(f) storing connected device data in a connected device data storage device, wherein the connected device data is data that indicates the devices that are connected by the connection in which the obstruction has occurred; and (g) determining whether the transfer device corresponding to the connected device data stored in the connected device data storage device at (f) is the nontransmitting transfer device, and in cases in which it is determined that the transfer device corresponding to the connected device data is the non-transmitting transfer device, determining whether or not it is possible to infer that there are more than one determined non-transmitting transfer devices and that there are connections among the more than one determined non-transmitting transfer devices.

8. An obstruction determination device for determining obstruction in a network including a plurality of transfer devices, the network including a plurality of transfer paths provided with the plurality of transfer devices that perform transfer of data between a server device and a plurality of respective client devices and have a plurality of the individual transfer devices positioned on each of the transfer paths, the obstruction determination device determines the presence or absence of an abnormality for each of a plurality of transfer paths, the obstruction determination device comprising:

a reception device that receives identification data associated with at least one transfer device, the identification data including connection data, transfer path identification data, and the transfer volume data, the connection data indicates connections between the transfer device associated with the identification data and at least one device selected from a group consisting of the server device, the plurality of client devices and a plurality of transfer devices, and transfer path identification data identifies a transfer path over which the data is transferred, and transfer volume data indicates volume of the transferred data;

a processor; and a memory storing instructions, which when executed by the processor performs a procedure, the procedure including:

(a) based on the connection data received by the reception device, determining whether the at least one transfer from which the connection data is received is device connected to a non-transmitting transfer device, the non-transmitting transfer device is a transfer device that is not transmitting the connection data associated therewith and whose position information with respect to a topology of the network is unavailable:

(b) in cases in which it is determined at (a) that the at least one transfer device is connected to the non-transmitting transfer device, receiving, by the reception device, the transfer path identification data associated with the at least one transfer devices that is connected to the non-transmitting transfer device, and, based on the received transfer path identification data, supplementing the position information of the non-transmitting transfer device with respect to the topology and identifying a non-transmitting transfer device transfer path that is a transfer path on which the non-transmitting transfer device is positioned; and (c) identifying the plurality of transfer paths, and for each of the identified transfer paths, receiving, by the reception device, the transfer volume data associated with transfer devices that are positioned on the identified transfer path, and determining whether an obstruction has occurred on the identified transfer path based on the received transfer volume data, and in cases in which the identified transfer path is the non-transmitting transfer device transfer path identified by the identification device, determining a transfer volume of the non-transmitting transfer device based on the received transfer volume associated with transfer device that is positioned on the non-transmitting transfer device transfer path, and determining whether an obstruction has occurred on the non-transmitting transfer device transfer path based on the received transfer volume data and the determined transfer volume of the non-transmitting transfer device;

(c) based on the determination result of whether or not the obstruction has occurred for each of the identified transfer paths at (d), determining a connection between a first device and a second device in which the obstruction has occurred, wherein the first device and the second device are each a device selected from the group consisting of the server device, the plurality of client devices and the plurality of transfer devices, and the second device is a device that receives data from the first device through the determined connection;

(e) storing connected device data in a connected device data storage device, wherein the connected device data is data that indicates the devices that are connected by the connection in which the obstruction has occurred; and (f) determining whether or not a transfer device corresponding to the connected device data stored in the connected device data storage device at (e) is the non-transmitting transfer device, and in cases in which it is determined that the transfer device corresponding to the connected device data is the non-transmitting transfer device, determining whether or not the connection data has been received from at least one transfer device connected to the determined non-transmitting transfer device.

9. The obstruction determination device of claim 8, the obstruction determination process further comprising: (g) determining whether or not the obstruction has occurred on the identified transfer path based on a difference in transfer volumes of transfer devices that are positioned on the identified transfer path.

10. The obstruction determination device of claim 8, the obstruction determination process further comprising:
(h) determining a difference between a first transfer volume of transfer devices positioned on the first transfer path, which is a transfer path of data from the client device to the server, and a second transfer volume of transfer devices positioned on the second transfer path, which is a transfer path of data from the server to the client device, and determining whether or not an obstruction has occurred on the first transfer path and the second transfer path based on the determined difference.

11. The obstruction determination device of claim 8, wherein the transfer devices are open flow switches.

12. The obstruction determination device of claim 8, wherein: each of the plurality of transfer devices includes a data transfer device that transfers the data, and a transmission device that transmits identification data that contains the connection data, the transfer path identification data, and the transfer volume data; and the transfer device is the non-transmitting transfer device if the transmission device of the transfer device does not transmit the identification data but the data transfer device of the transfer device transfers the data, or if the data transfer device of the transfer device does not transfer the data.

* * * * *